(12) United States Patent
Hayashi et al.

(10) Patent No.: US 6,535,616 B1
(45) Date of Patent: Mar. 18, 2003

(54) INFORMATION PROCESSING APPARATUS, METHOD AND MEMORY MEDIUM THEREFOR

(75) Inventors: Junichi Hayashi, Kawasaki (JP); Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/334,749

(22) Filed: Jun. 17, 1999

(30) Foreign Application Priority Data

Jun. 24, 1998 (JP) .......................................... 10-177128

(51) Int. Cl.[7] .................................................. G06K 9/00
(52) U.S. Cl. ....................................... 382/100; 382/233
(58) Field of Search ................................ 382/100, 233, 382/232, 251, 248, 240; 380/201, 206, 207, 208; 709/217, 313; 375/130

(56) References Cited

U.S. PATENT DOCUMENTS

| | | | |
|---|---|---|---|
| 5,600,720 A | 2/1997 | Iwamura et al. ................. 380/1 |
| 5,666,419 A | 9/1997 | Yamamoto et al. ............ 380/28 |
| 5,915,027 A | * 6/1999 | Cox et al ...................... 380/54 |
| 5,937,395 A | 8/1999 | Iwamura ....................... 705/30 |
| 5,949,055 A | * 9/1999 | Fleet et al. .................. 235/469 |
| 6,061,793 A | * 5/2000 | Tewfik et al. ................ 713/176 |
| 6,240,121 B1 | * 5/2001 | Senoh .......................... 375/130 |

FOREIGN PATENT DOCUMENTS

| | | |
|---|---|---|
| EP | 0 642 060 | 3/1995 |
| EP | 0 891 071 | 1/1999 |
| WO | WO 99 01980 | 1/1999 |

OTHER PUBLICATIONS

"A Robust Digital Image Watermarking Method Using Wavelet–Based Fusion", D. Kundur, et al., Proceedings of the International Image Processing, U.S. Los Alamitos, CA, IEE, Oct. 1997, pp. 544–547, XP000668950, ISBN: 0–8186–8184–5.

"Use of the Wavelet Transformation to Embed Signatures in Images", K. Matsui, et al., Systems & Computers in Japan, U.S., Scripta Technica Journals, New York, vol. 28, No. 1, 1997, pp. 87–83, XP000692721, ISSN: 0882–1666.

* cited by examiner

Primary Examiner—Leo Boudreau
Assistant Examiner—Seyed Azarian
(74) Attorney, Agent, or Firm—Fitzpatrick, Cella, Harper & Scinto

(57) ABSTRACT

The invention efficiently controls the method for embedding digital watermark information into digital information or detecting such digital watermark information. Also in case the digital information has components of different kinds, the invention enables individual management of the digital watermark information and information indicating the embedding method therefor. In a configuration for attaining these objects, there are provided input means for inputting the digital information composed of signal components of plural kinds, and control means for controlling the method for embedding the digital watermark information in the signal component of a first kind contained in the signal components of plural kinds, based on the signal component of a second kind contained in the signal components of plural kinds.

32 Claims, 14 Drawing Sheets

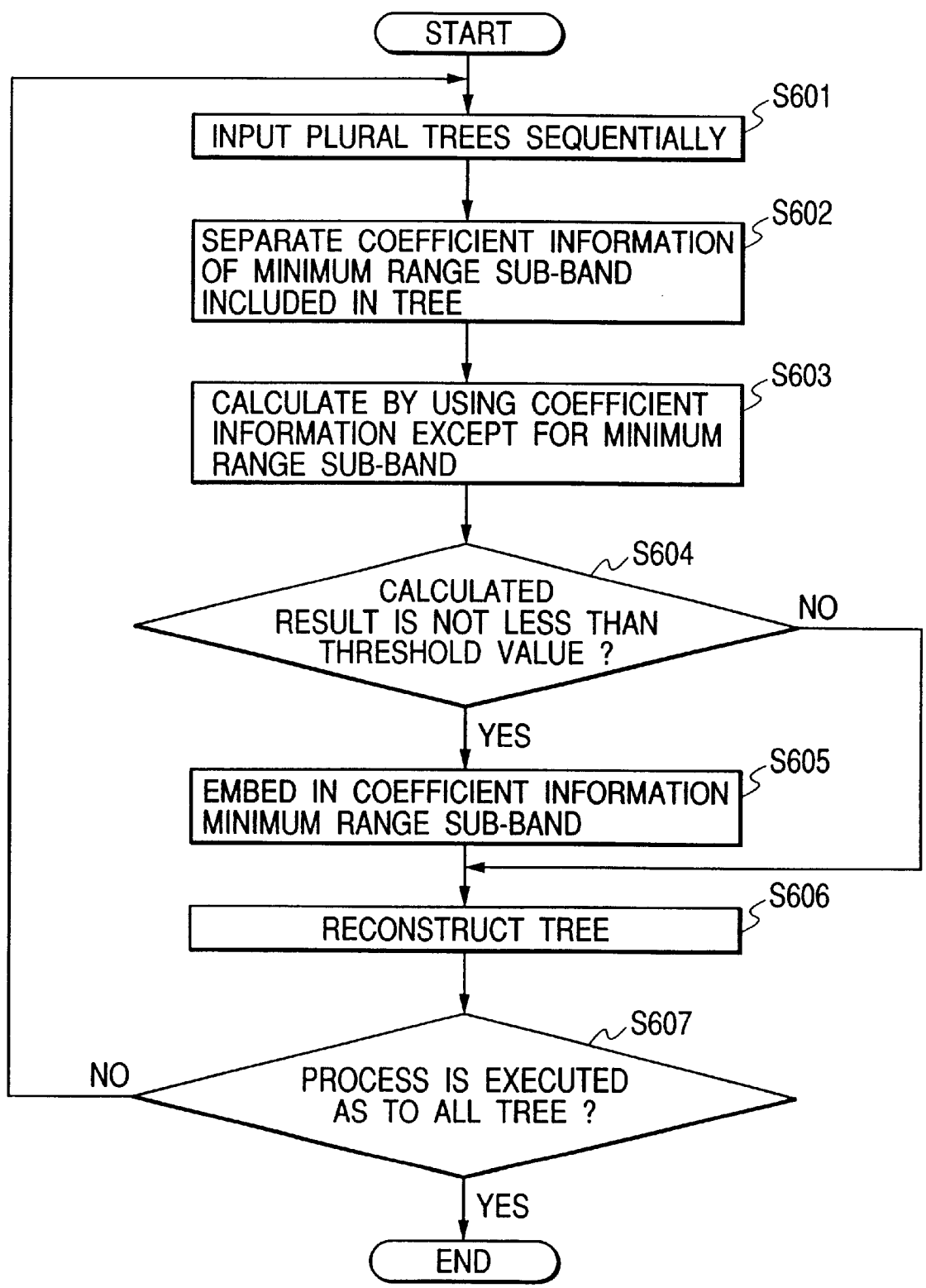

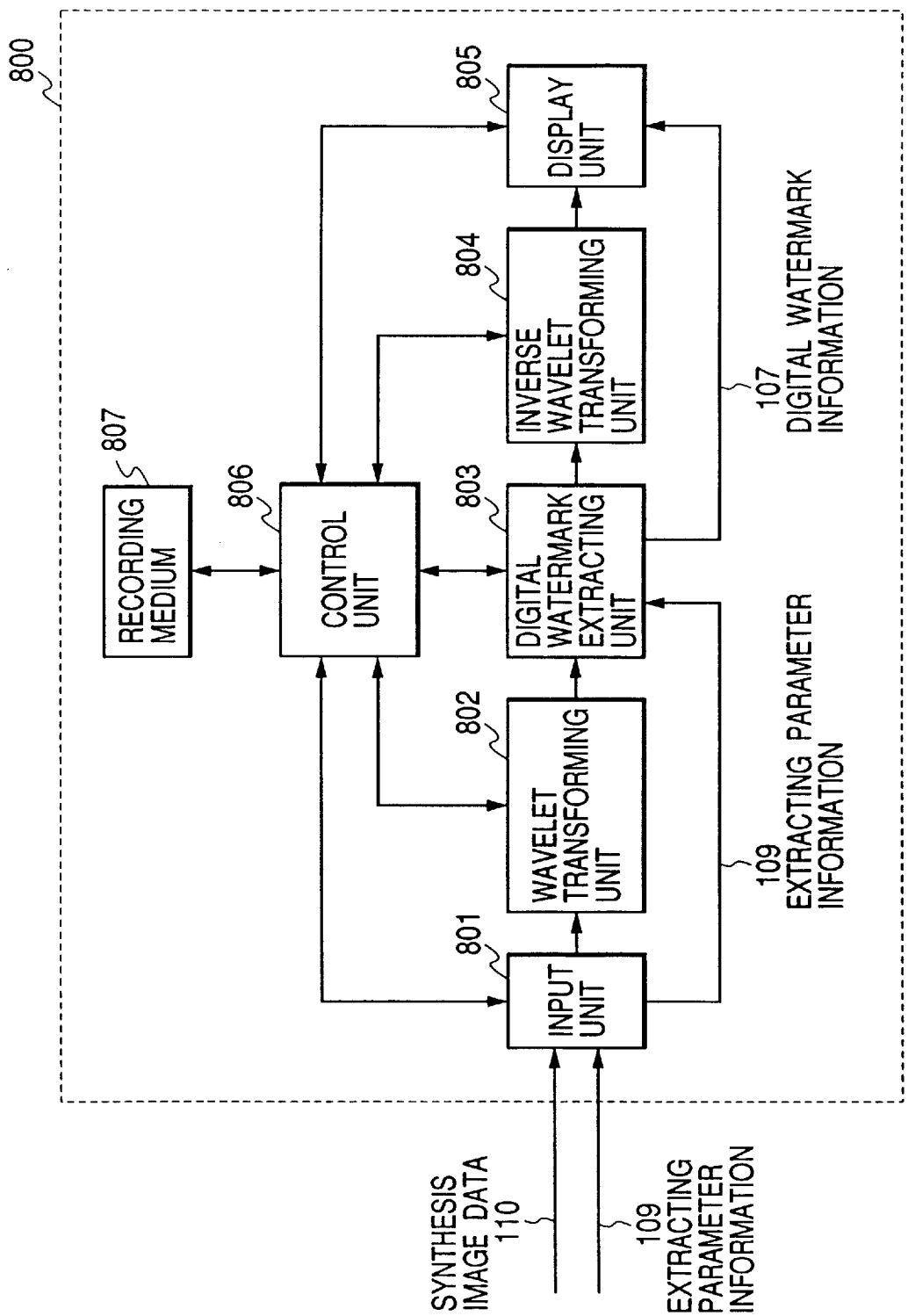

INFORMATION PROCESSING APPARATUS, METHOD AND MEMORY MEDIUM THEREFOR

BACKGROUND OF THE INVENTION

1. Field of the Invention

The present invention relates to an information processing apparatus for protecting the copyright of digital information, preventing forging and illegal copying thereof, a method therefor and a memory medium storing such method.

2. Related Background Art

With the recent remarkable progress in computer and network technology, various digital information (for example text data, image data, audio data etc.) are being handled in computers and in networks.

In such environment, the user can easily process the digital information and can also easily reproduce information same as the original.

Therefore, in order to protect the copyright of such digital information, there is being developed a technology of embedding, in the digital information itself, copyright information or user information relating to the digital information as digital watermark information.

Such digital watermarking technology is intended to apply a predetermined process to the digital information such as image data or audio data, and to embed certain information into such digital information so as to be invisible to the user.

The copyright owner of the digital information can obtain the copyright information or the user information of the digital information by extracting the digital watermark information therefrom, and can trace the illegal copy.

For embedding the digital watermark information, there are known following two methods: the first method includes embedding in the space area of the digital information, while the second method includes embedding in the frequency area of the digital information.

However there has not yet been established a technology of efficiently determining the method for embedding or extracting the digital watermark information into or from the digital information.

SUMMARY OF THE INVENTION

In consideration of the foregoing, the principal object of the present invention is to provide a technology for efficiently controlling the method for embedding the digital watermark information into the digital information or for extracting such digital watermark information.

Another object of the present invention is to enable, in case the above-mentioned digital information has components of different kinds, individual management of the digital watermark information and the information representing the method for embedding the digital watermark information (or method for detecting such information).

The foregoing objects can be attained, according to a preferred embodiment of the present invention, by an information processing apparatus capable of embedding digital watermark information into digital information, comprising:

input means for inputting digital information including signal components of plural kinds; and control means for controlling the method for embedding the digital watermark information into the signal component of a first kind contained in the signal components of said plural kinds, based on the signal component of a second kind contained in the signal components of said plural kinds.

According to another preferred embodiment, there is provided an information processing apparatus capable of embedding digital watermark information into digital information, comprising:

input means for inputting digital information including signal components of plural kinds; and control means for controlling whether or not to embed the digital watermark information into the signal component of a first kind contained in the signal components of said plural kinds, based on the signal component of a second kind contained in the signal components of said plural kinds.

According to still another preferred embodiment, there is provided an information processing apparatus comprising:

input means for inputting digital information in which digital watermark information is embedded, wherein said digital information is composed of signal components of plural kinds; and discrimination means for discriminating the embedding method of the digital watermark information into the signal component of a first kind, based on the signal component of a second kind contained in said digital information and different from said first kind.

According to still another preferred embodiment, there is provided an information processing apparatus comprising:

input means for inputting digital information in which digital watermark information is embedded, wherein said digital information is composed of signal components of plural kinds; and discrimination means for discriminating whether the digital watermark information is embedded in the signal component of a first kind, based on the signal component of a second kind contained in said digital information and different from said first kind.

Still other objects of the present invention, and the features thereof, will become fully apparent from the following description of the embodiments, to be taken in conjunction with the accompanying drawings.

BRIEF DESCRIPTION OF THE DRAWINGS

FIG. 6 is a flow chart showing the function of the digital watermark embedding unit 103 of the first embodiment;

FIG. 8 is a block diagram showing the configuration of an information processing apparatus 800 of the first embodiment;

DETAILED DESCRIPTION OF THE PREFERRED EMBODIMENTS

In the following there will be explained preferred embodiments of the present invention.

First Embodiment (1) Information Processing Apparatus 100

Figure 1:
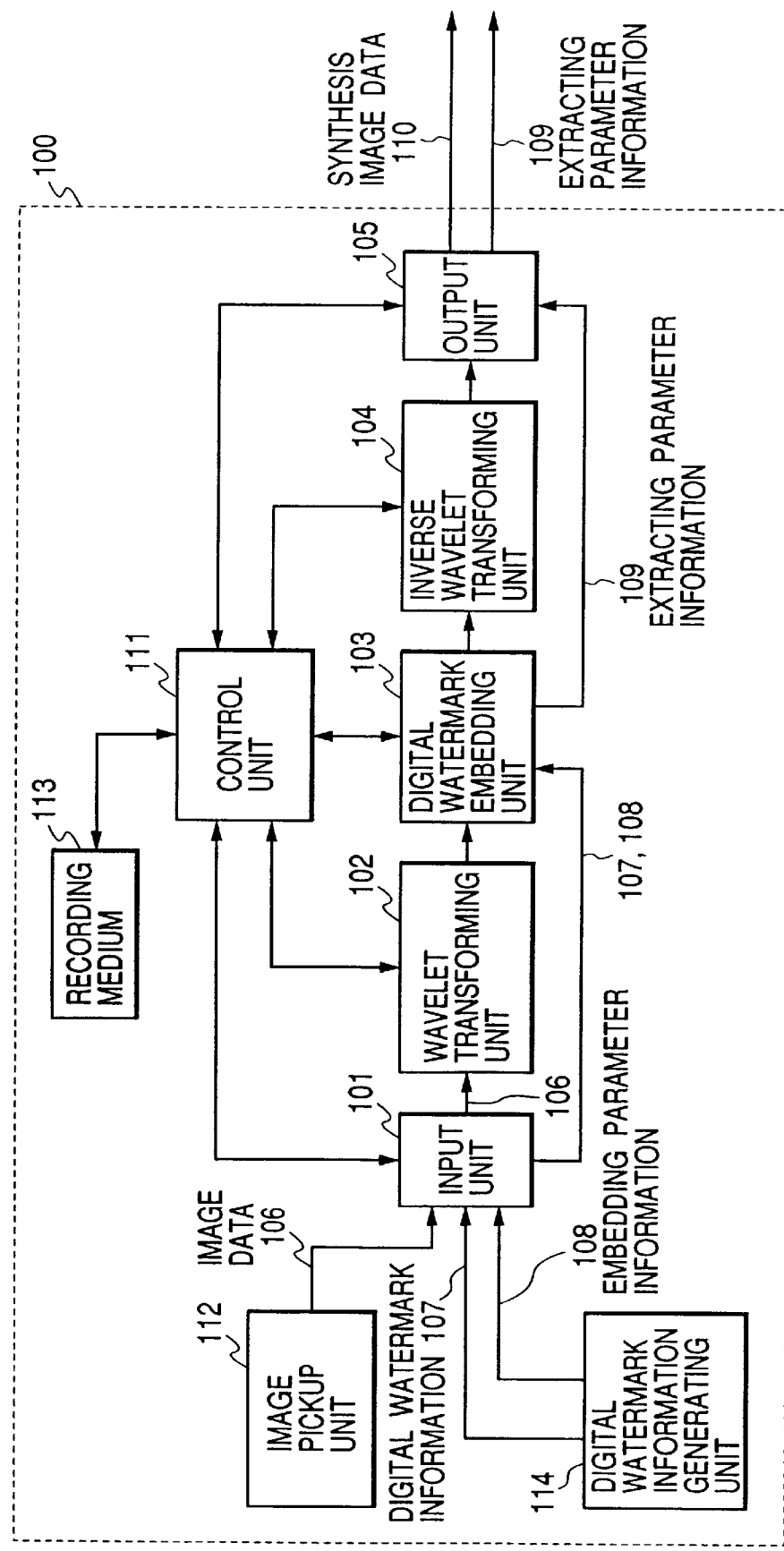
FIG. 1 is a block diagram showing the configuration of an information processing apparatus 100 of a first embodiment.

FIG. 1 is a block diagram showing the configuration of an information processing apparatus 100 of a first embodiment. The information processing apparatus 100 serves to embed predetermined digital watermark information into image data. In the first embodiment, the information processing apparatus 100 is provided with image taking means such as a digital camera, a camera-integrated digital video tape recorder or a scanner.

At first there will be briefly explained the process executed in the information processing apparatus 100.

Referring to FIG. 1, data entered into an input unit 101 are multi-value image data 106 having a predetermined number of bits per pixel, digital watermark information 107, and embedding parameter information 108 required in embedding the digital watermark information 107.

The multi-value image data 106 are still image data or moving image data taken by an image pickup unit 112. In case of moving image data, the data are supplied to the input unit in the unit of a predetermined number of image frames. The image pickup unit 112 is provided with at least a lens and at least an image pickup device. Utilizing these lens and image pickup device, it converts the optical image of an object into predetermined electrical signals and supplies the input unit 101 with such electrical signals as multi-value image data.

The digital watermark information 107 contains at least one of copyright information, personal information of the user (for example, name, age, telephone number, e-mail address etc.), information relating to the multi-value image data 106 (for example location of image taking, date and time of image taking, specific comment by the user etc.), information relating to the information processing apparatus 100 (for example maker name, model name etc.), image information including a predetermined mark (for example emblem, logo, stamp etc.) and two-dimensional information for detecting forging. Such information is either stored in advance in a digital watermark generation unit 114 or set by the user in the digital watermark generation unit 114. The content of the digital watermark information 107 is selected according to the object such as protection of copyright, detection of forging or tracing of illegal copy.

The multi-value image data 106 entered into the input unit 106 are supplied to a wavelet transformation unit 102. The digital watermark information 107 and the embedding parameter information 108 entered into the input unit 106 are supplied to a digital watermark embedding unit 103.

The wavelet transformation unit 102 executes a predetermined transformation process on the multi-value image data supplied from the input unit 101. The detailed functions of the wavelet transformation unit 102 will be explained later.

Coefficient information (each information being a value generated by frequency analysis) outputted from the wavelet transformation unit 102 is supplied to the digital watermark embedding unit 103.

The digital watermark embedding unit 103 embeds the digital watermark information 107 in the coefficient information outputted from the wavelet transformation unit 102, utilizing the embedding parameter information 108. The detailed functions of the digital watermark embedding unit 103 will be explained later.

The digital watermark embedding unit 103 supplies an inverse wavelet transformation unit 104 with the coefficient information in which the digital watermark information 107 is embedded. Also the digital watermark embedding unit 103 supplies an output unit 10 with extracting parameter information 109 required for extracting the digital watermark information 107 from the coefficient information.

The inverse wavelet transformation unit 104 executes a process, corresponding to that of the wavelet transformation unit 102, on the coefficient information supplied from the digital watermark embedding unit 103 and supplies the output unit 105 with thus generated synthesized image data 110.

The output unit 105 outputs, to the exterior, the synthesized image data 110 in which the digital watermark information 107 is embedded, and the extracting parameter information 109 required for extracting the digital watermark information 107 from the synthesized image data 110.

The output unit 105 may, for example, execute the output to a bus-type transmission channel through a digital interface based on the IEEE1394 standard.

Referring again to FIG. 1, the information processing apparatus 100 is provided with a control unit 111 for controlling the functions of various process units in the apparatus 100 and a recording medium 113 storing program codes readable by the control unit 111. In particular, the recording medium 113 stores program codes for controlling the function of the digital watermark embedding unit 103 and realizing the functions of the first embodiment.

In the following there will be given a detailed explanation on the processes executed by various process units provided in the information processing apparatus 100.

(2) Wavelet Transformation Unit 102

Figure 2:
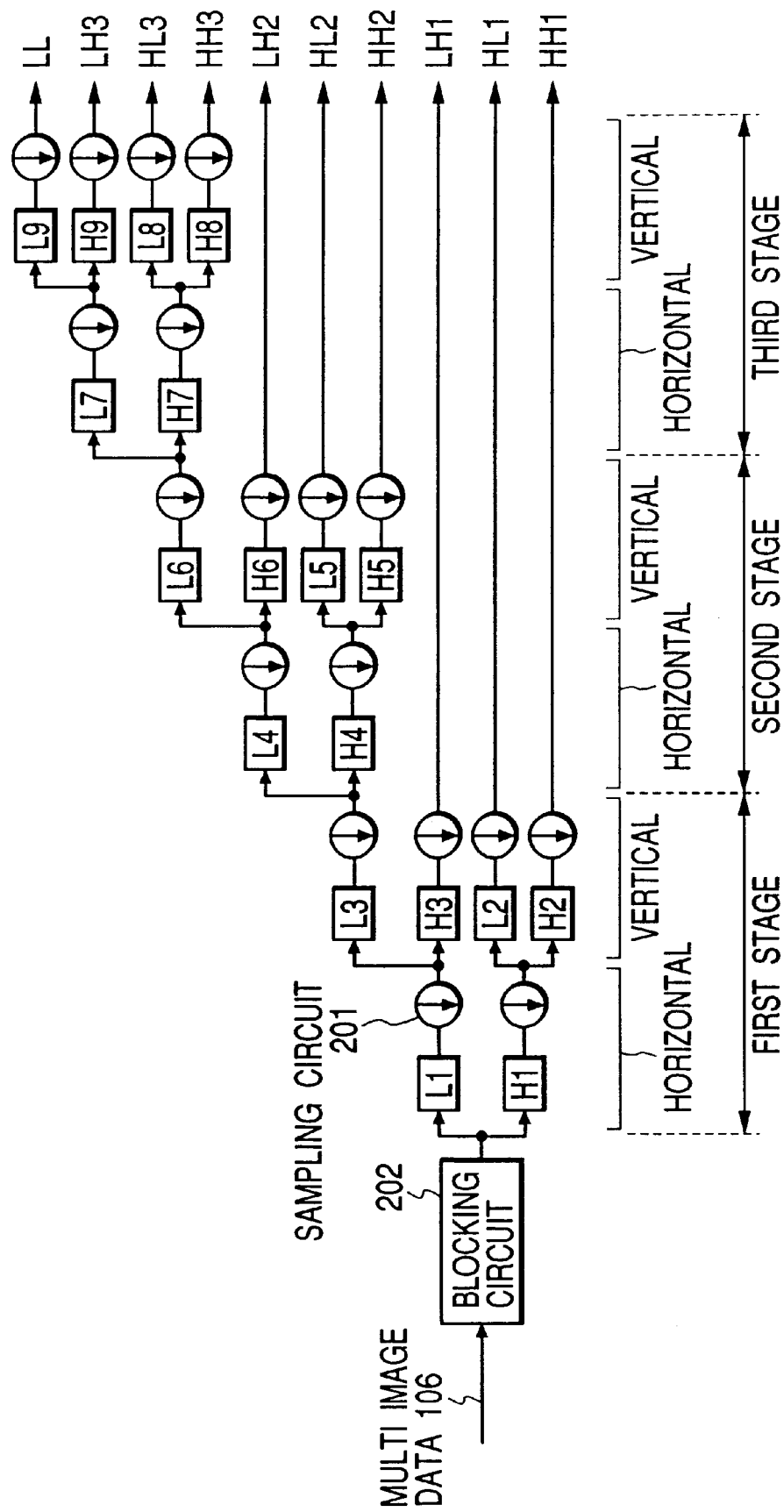
FIG. 2 is a view showing the configuration of a wavelet transformation unit 102 in the first embodiment.
Figure 3:
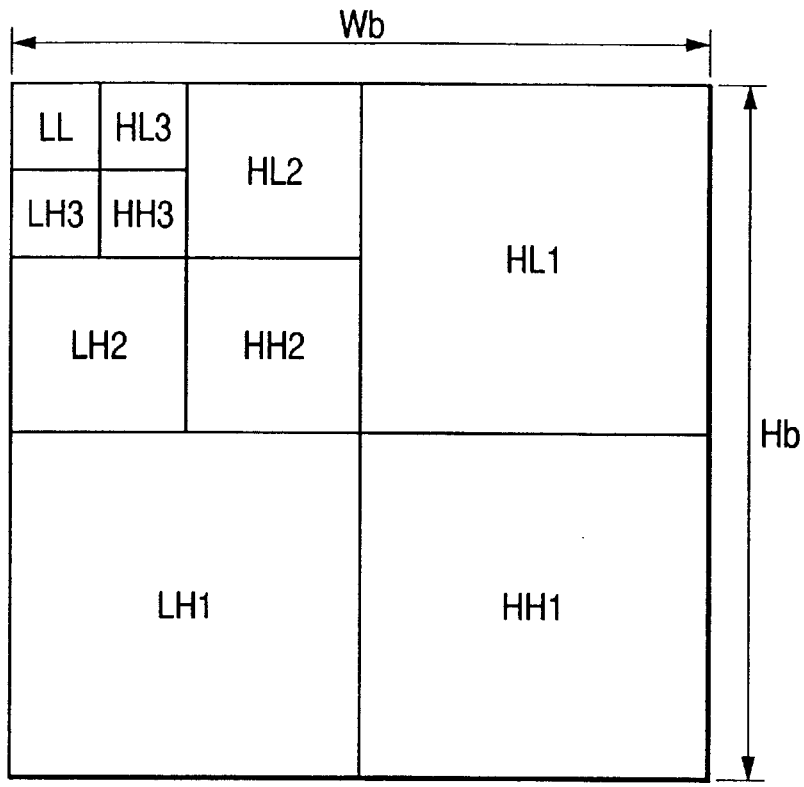
FIG. 3 is a view showing sub-bands generated by the wavelet transformation process.

At first there will be explained detailed functions of the wavelet transformation unit 102 with reference to FIGS. 2 and 3. FIG. 2 is a block diagram showing the configuration of the wavelet transformation unit 102, and FIG. 3 is a view showing the concept of sub-bands generated by the wavelet transformation process.

Referring to FIG. 2, a blocking circuit 202 in the wavelet transformation unit 102 divides the entered multi-value image data 106 of an image frame into at least a block (or area) of a predetermined size. The predetermined size is defined by dividing the multi-value image data 106 of one image frame in the unit of Wb pixels in the lateral direction by Hb pixels in the vertical direction (wherein Wb and Hb are positive integers).

The wavelet transformation unit 102 executes wavelet transformation in succession on the output of the blocking circuit 202, thereby decomposing the image data into frequency bands (hereinafter called sub bands) of a predetermined number.

More specifically, the wavelet transformation unit 102 enters the horizontal component of the above-mentioned block into a low pass filter L1 and a high pass filter H1, and the outputs of the filters are sub-sampled by a sub-sampling circuit 201.

The result r(n) of the processing in the low pass filter L1 and the sub-sampling circuit 201 is represented by the following equation (1) while the result d(n) of the processing the high pass filter H1 and the sub-sampling circuit 202 is represented by the equation (2):

$$r(n) = <<(x(2n)+x(2n+1))/2>> \quad (1)$$

$$d(n) = x(2n+2) - x(2n+3) + <<(-r(n)+r(n+2)+2)/4>> \quad (2)$$

wherein <<x>> indicates the maximum integer not exceeding x.

Then the wavelet transformation unit 102 enters the vertical component of the multi-value image data 106, processed in succession in the high pass filter H1 and the sub-sampling circuit 201, into a low pass filter L2 and a high pass filter H2, and the outputs of the filters are sub-sampled by the sub-sampling circuit 201.

Also the wavelet transformation unit 102 enters the vertical component of the multi-value image data 106, processed in succession in the low pass filter L1 and the sub-sampling circuit 201, into a low pass filter L3 and a high pass filter H3, and the outputs of the filters are sub-sampled by the sub-sampling circuit 201.

The above-described procedure is taken as a step, and the wavelet transformation unit 102 again executes a procedure similar to the above-mentioned step on the block of which the horizontal component and the vertical component have passed the low pass filter.

By executing such procedure by N steps (N being a positive integer), the wavelet transformation unit 102 can decompose at least a block of the predetermined size in succession into plural sub bands. The wavelet transformation unit 102 of the present embodiment executes the process of three steps on the multi-value image data 106.

The size of the block (block size being Wb pixels in the horizontal direction and Hb pixels in the vertical direction) subjected to wavelet transformation by the wavelet transformation unit 102, and the plural sub bands (LL, LH3, HL3, HH3, LH2, HL2, HH2, LH1, HL1, HH1) generated from such block are illustrated in FIG. 3. Each sub band in FIG. 3 contains transformation coefficient information (data including a predetermined frequency component) corresponding to the spatial position of the original image.

Figure 4:
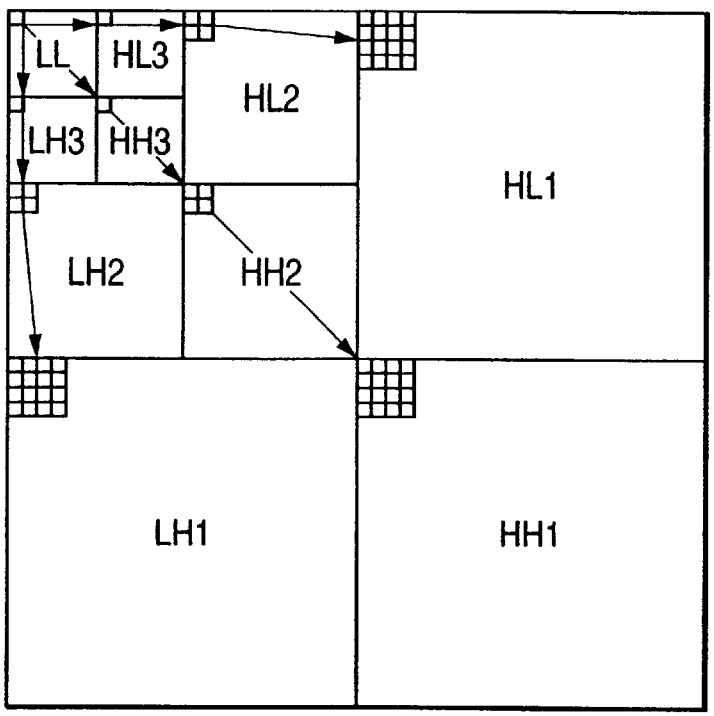
FIG. 4 is a view showing a tree structure in the wavelet transformation area.

In the present embodiment, among the plural coefficient information contained in the sub bands, a group of coefficient information corresponding to the spatial position same as that in the original image is called a tree. FIG. 4 shows a tree structure in the wavelet transformation area.

The wavelet transformation unit 102 executes wavelet transformation on each block, and then supplies the digital watermark embedding unit 103 with plural trees corresponding to a predetermined spatial position.

(3) Digital Watermark Embedding Unit 103

Figure 5:
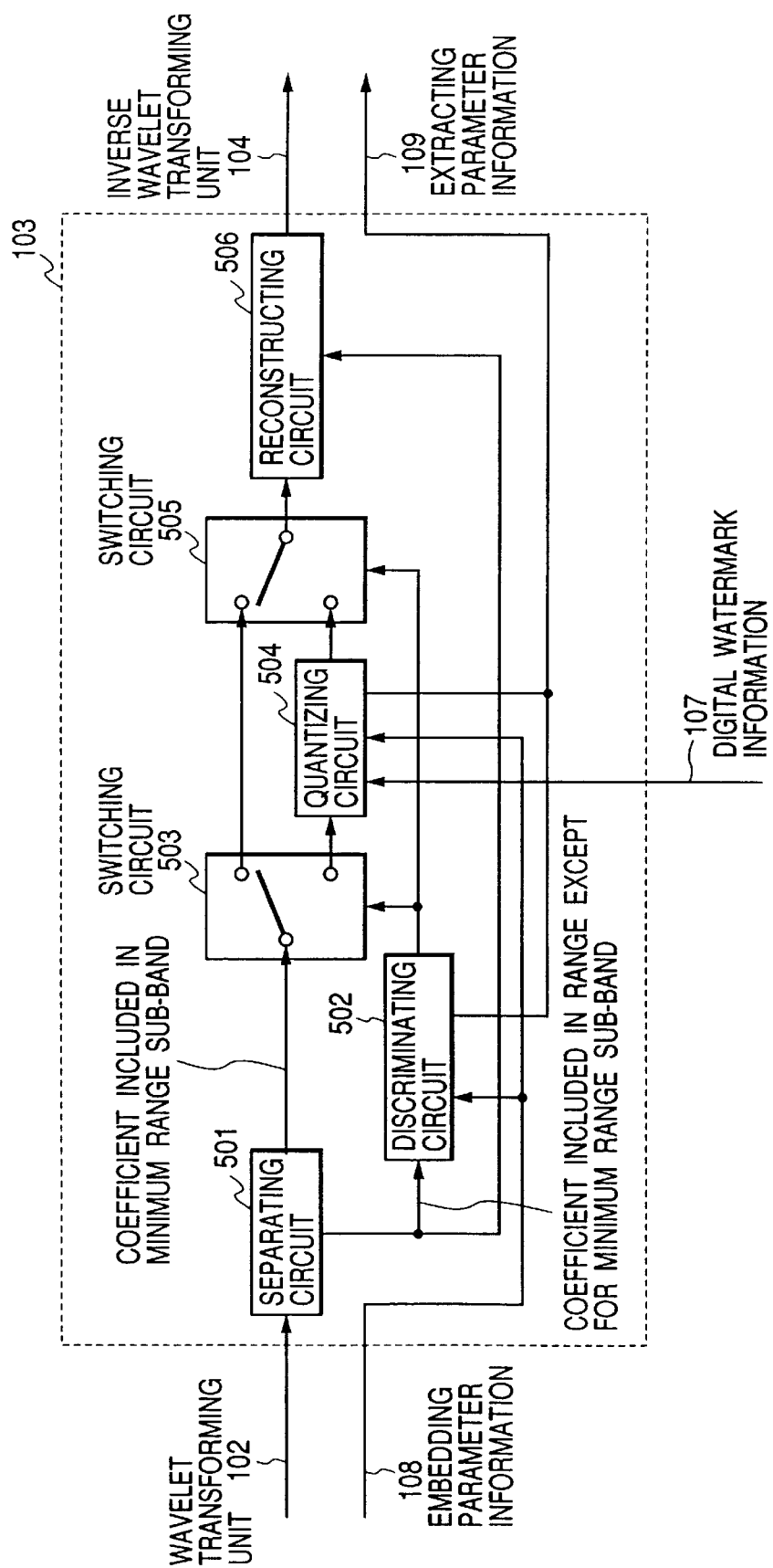
FIG. 5 is a block diagram showing the configuration of a digital watermark embedding unit 103 of the first embodiment.

In the following there will be explained, with reference to FIGS. 5 and 6, the detailed function of the digital watermark embedding unit 103. FIG. 5 is a block diagram showing the configuration thereof of the first embodiment, and FIG. 6 is a flow chart showing the function thereof.

It is already known that, in case of applying the wavelet transformation to a ordinary natural image, the minimum range sub band (LL) contains a signal of a very L1 large information amount, while other sub bands contain signals of local and low information amount such as an edge portion or a texture area of the image.

In case of applying a signal processing to the coefficient information contained in a low sub band, the influence on the original image signal (for example image quality deterioration) generally becomes large. Therefore, in order to minimize the influence on the original image signal in embedding the digital watermark information into the image data, it is conceivable to execute such embedding into the coefficient information contained in the higher sub bands.

However, in trying to eliminate the digital watermark information from the image data subjected to such embedding process, the user can demolish or erase the digital watermark information by replacing all the coefficient information, contained in the higher sub bands which are assumed to contain the embedded digital watermark information, with zero. Besides, in such case, as the coefficient information contained in the higher sub bands alone are changed, the user can eliminate the digital watermark information, scarcely deteriorating the original image.

In the present embodiment, a predetermined signal processing on the image data by the user for the purpose of demolishing or erasing only the digital watermark information contained in such image data with scarce visual deterioration thereof will be called "attack".

In consideration of the resistance to the attack by the user on the synthesized image, it is desirable to embed the digital watermark information not only in the higher sub bands but also in lower sub bands.

However, because of the relationship between the influence on the original image signal and the resistance to the attack, the influence on the original image signal becomes less negligible, as the frequency band becomes lower in which the digital watermark information is embedded.

In consideration of such tendency, the present embodiment provides a process for embedding the digital watermark information 107 so as to increase the resistance to the attack by the user while minimizing the influence on the original image signal as far as possible.

In a step S601, a separating circuit 501 enters, in succession, plural trees (each tree being composed of a group of plural coefficient information corresponding to a predetermined spatial position of each block) contained in each of at least a block (or area) subjected to the wavelet transformation by the wavelet transformation unit 102.

In a step S602, the separating circuit 501 separates, for each tree supplied from the wavelet transformation unit 102, the coefficient information constituting such tree into a coefficient information contained in the minimum range sub band (LL) and plural coefficient information contained in sub bands other than the minimum one.

The separating circuit 501 sends the coefficient information contained in the minimum range sub band to a switching circuit 503 and the coefficient information contained in other sub bands to a discriminating circuit 502.

In a step S603, the discriminating circuit 502 executes a predetermined operation on the plural coefficient information supplied from the separating circuit 501, and determines whether or not to embed the digital watermark information into the coefficient information contained in the minimum range sub band.

An example of the predetermined operation includes calculating the sum of the absolute values of the coefficient information and comparing the sum with a predetermined threshold value. This process will be explained in more detail in the following.

As explained in the foregoing, in case of applying the wavelet transformation on a natural image, signals corresponding to the edge portions and texture areas of the image are locally present in sub bands other than the minimum range sub band.

In each tree, the sum of the absolute values of the plural coefficient information contained in the sub bands other than the minimum range sub band is anticipated to increase in an edge portion or a texture area of the image.

Consequently, a tree in which the sum of the absolute values of the coefficient information contained in the sub bands other than the minimum one increases corresponds to a portion showing a large variation among the edge portions and texture areas of the image, namely a portion of a large variation in the spatial area of the image.

The digital watermark embedding unit 103 of the first embodiment embeds the digital watermark information into the image, utilizing a property that "the human vision cannot easily detect a small variation in a portion with a large variation in the spatial area". Thus the digital watermark information becomes less detectable to the human eyes.

In a step S604, the discriminating circuit 502 compares the sum of the absolute values in each tree with a predetermined threshold value and selects, for embedding, the coefficient information contained in the minimum range sub band of a tree for which the threshold value is exceeded. The result of such selection is supplied to switching circuits 503, 505 for controlling the functions of various units.

The predetermined threshold value is one of the embedding parameter information 108 and becomes a parameter for determining the information amount of the digital watermark information that can be embedded. More specifically, with an increase in the above-mentioned threshold value, the number of the selected trees becomes fewer and the amount of the embeddable information becomes less, while, with a decrease in the threshold value, the number of the selected tree increases and the amount of the embeddable information becomes larger.

In the first embodiment, the control unit 111 can also adaptively vary the threshold value to be used in the discriminating circuit 502, according to the characteristics of the image data or each block (or area). Thus the control unit 111 can variably control the amount of the embeddable information.

The predetermined threshold value used in the discriminating circuit 502 is supplied to the exterior, as one of the extracting parameter information 109 required for extracting the digital watermark information 107 from the synthesized image 110.

By selecting the coefficient information contained in the minimum range sub band of the tree selected by the above-described information as the object of embedding, it is rendered possible to embed the digital watermark information so as to elevate the resistance to the attack by the user and to minimize the influence on the original image signal as far as possible.

In the tree discriminated as the object of embedding by the discriminating circuit 502, the coefficient information contained in the minimum range sub band is supplied through the switching circuit 503 to a quantizing circuit 504. On the other hand, in the tree discriminated not as the object of embedding by the discriminating circuit 502, the coefficient information contained in the minimum range sub band is supplied to the switching circuit 505. The switching circuit 503 is controlled according to the result of discrimination by the discriminating circuit 502.

In a step S605, the quantizing circuit 504 executes a process of embedding the digital watermark information in succession into the coefficient information contained in the minimum range sub bands of the plural trees selected by the discriminating circuit 502. More specifically, the quantizing circuit 504 executes the embedding for example by quantization.

In the following there will be explained the process of the quantizing circuit 504.

In the present embodiment, the quantization means a process rounding continuous values into linear or non-linear discrete values, or discrete values into linear or non-linear discrete values of a different width. A discrete value rounded by such quantization is called a quantization representative value. Also the distance of the discrete values, or the distance of the mutually adjacent quantization representative values, is called a quantization step.

The quantizing circuit 504 of the present embodiment executes embedding, according to the following embedding rule, of 1-bit information (namely "0" or "1") constituting the digital watermark information 107 into the coefficient information containing in the minimum range sub and of a tree:

(1) In case a bit of the digital watermark information is "0", it is quantized to the quantization representative value of a nearest even index;

(2) In case a bit of the digital watermark information is "1", it is quantized to the quantization representative value of a nearest odd index;

wherein index means the quotient obtained by dividing the quantization representative value with the quantization step.

The magnitude of the quantization step is one of the embedding parameter information 108 and corresponds to the intensity of embedding. Stated differently, an increase in the quantization step allows to elevate the resistance to the attack to the synthesized image. Also, based on the relationship between the image quality deterioration and the resistance to the attack, a decrease in the quantization step allows to suppress the deterioration in the quality of the synthesized image.

In the first embodiment, the control unit 111 can arbitrarily set the value of the quantizing step to be used by the quantizing circuit 504 according to the characteristics of the image block or of each block. The above-mentioned value is supplied to the exterior as one of the extracting parameter information 109, required for extracting the digital watermark information 107 from the synthesized image 110.

The coefficient information subjected to the embedding process in the quantizing circuit 504 is supplied to the switching circuit 505, which supplies a reconstructing circuit 506 with the coefficient information supplied from the switching circuit 503 or from the quantizing circuit 504. The function of the switching circuit 505 is controlled by the discriminating circuit 502.

In a step S606, the reconstructing circuit 506 synthesizes the coefficient information (supplied from the switching circuit 505) contained in the minimum range sub band corresponding to each tree and the coefficient information (supplied from the separating circuit 501) contained in sub bands other than the minimum one to reconstruct the tree structure shown in FIG. 4. The output of the reconstructing circuit 506 is supplied, as the output of the digital watermark embedding unit 103, to an inverse wavelet transformation unit 104 for each block.

Thus, the digital watermark information can be embedded into the coefficient information contained in the minimum range sub bands of the blocks, by executing the above-described process to all the trees (step S607). It is thus rendered possible to increase the resistance to the attack by the user while minimizing the influence on the original image signal as far as possible.

In the first embodiment, the separating circuit 501 separates the coefficient information constituting each tree into the coefficient information contained in the minimum range sub band and that contained in other sub bands, but such form is not restrictive. For example, the separation may be made into the coefficient information contained in at least a predetermined sub band and that contained in other sub bands. In such case, the quantizing circuit 504 may embed the digital watermark information 107 into the coefficient information contained in at least a predetermined sub band mentioned above, based on the result of discrimination by the discriminating circuit 502.

In the first embodiment, as explained in the foregoing, in the multi-value image data 107, the information determining the embedding position of the digital watermark information 107 (namely the plural coefficient information contained in the sub bands other than the minimum range sub band in each tree) is different from the information in which the digital watermark information 107 is to be embedded (namely the coefficient information contained in the minimum range sub band in each tree).

Also in the first embodiment, it is possible to independently set the parameter information for determining the information amount of the digital watermark information 107 (namely the predetermined threshold value used in the discriminating circuit 501) and the parameter information for determining the level of resistance to the attack or of the image quality deterioration (namely the magnitude of the quantization step to be used in the quantizing circuit 504).

Furthermore, in the first embodiment, since the digital watermark information 107 is embedded in the coefficient information contained in the minimum range sub band, the digital watermark information cannot be demolished or erased without significant deterioration of the image quality even in case of an attack.

In the first embodiment, the digital watermark embedding unit 103 determines the embedding position of the digital watermark information 107 according to the sub of the absolute values of the plural coefficient information contained in all the sub bands other than the minimum one in each tree, but such form is not restrictive.

For example it is also possible, for example, to determine the embedding position according to the absolute values of the plural coefficient information contained in a part of the sub bands other than the minimum range sub band.

It is furthermore possible to adaptively weight absolute values of the plural coefficient information contained in the sub bands other than the minimum one respectively for such sub bands (namely forming a product of the absolute value of the coefficient information corresponding to each sub band and a predetermined value) and to determine the embedding position according to the sum of thus weighted values.

In such case, it is also possible to execute smaller weighting on the lower sub bands and larger weighting on the higher sub bands, utilizing the general characteristics of the natural image subjected to the wavelet transformation (namely the absolute value of the coefficient information contained in a lower sub band is larger than that contained in a higher sub band).

It is therefore rendered possible to consider the coefficient information contained in the high sub band and to determine the most appropriate embedding position. Also, depending on the method of weighting, the embedding position can be so determined as to reduce the deterioration in the image quality.

Also in the first embodiment, the digital watermark embedding unit 103 is so constructed as to embed the digital watermark information 107 into the minimum range sub band of each tree, but the embedding position is not limited to the minimum range sub band. It is also possible to adopt such control as to execute the embedding in at least one among the low and middle sub bands.

In such case, the discriminating circuit 502 determines whether or not to embed a part of the digital watermark information 107 into the coefficient information of the above-mentioned predetermined sub band, based on the coefficient information of the sub bands other than the predetermined sub band mentioned above. In this manner it is possible to embed the digital watermark information of a larger information amount so as to reduce the deterioration in the image quality.

Furthermore, the digital watermark embedding unit 103 of the first embodiment embeds the digital watermark information 107 into the coefficient information of the minimum range sub band of all the trees for which the aforementioned threshold value is exceeded, but the embedding may also be made in certain predetermined trees instead of all the trees.

Figure 7A:
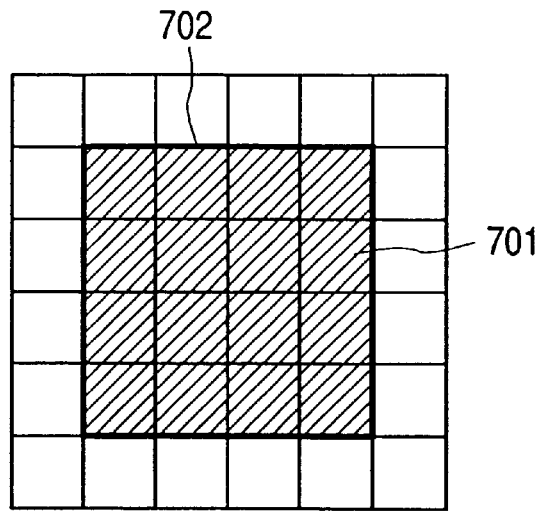
FIGS. 7A, 7B and 7C are views showing examples of embedded pattern in a specified block.
Figure 7B:
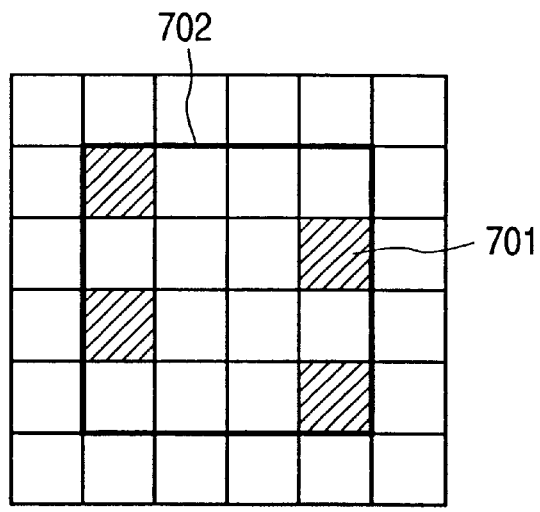
Figure 7C:
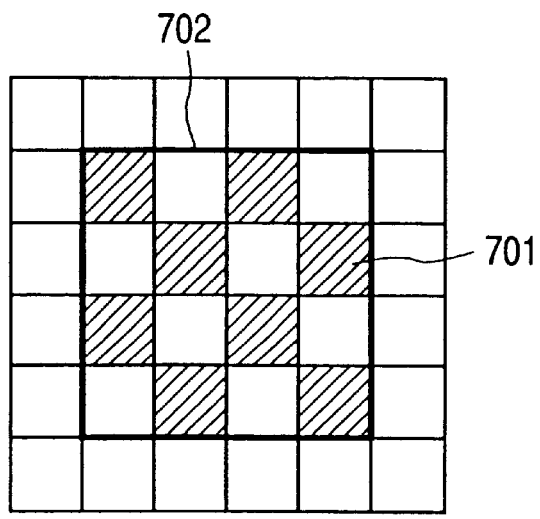

For example, it is also possible to variably control the embedded pattern for the predetermined tree as shown in FIGS. 7A to 7C. FIG. 7A shows a tree 701 constituting the object of embedding and an embeddable area 702, while FIGS. 7B and 7C show examples of embedded pattern.

In this case, the embedded pattern is variably set for example according to the information amount of the digital watermark information 107, number of embeddable trees, magnitude of predetermined coefficient information contained in the predetermined sub band, configuration of the two-dimensional information for detecting forging etc. The embedded pattern information is supplied, as one of the extracting parameter information 109, to the output unit 105.

(4) Information Processing Apparatus 800

FIG. 8 is a block diagram showing the configuration of an information processing apparatus 800 of the first embodiment, adapted to extract the digital watermark information embedded by the information processing apparatus 100. The information processing apparatus 800 is composed for example of a personal computer.

At first there will be briefly explained the process executed by the information processing apparatus 800.

Referring to FIG. 8, an input unit 801 receives synthesized image data 110 outputted from the information processing apparatus 100 shown in FIG. 1, and the extracting parameter information 109 required for extracting the digital watermark information 107 embedded in the synthesized image data 110.

The synthesized image data 110 (containing the embedded digital watermark information 107) entered into the input unit 801 are supplied to a wavelet transformation unit 802. Also the extracting parameter information 109 entered into the input unit 801 are supplied to a digital watermark extracting unit 803.

The wavelet transformation unit 802 executes, on the synthesized image data supplied from the input unit 801, a process similar to that executed by the aforementioned wavelet transformation unit 102.

The coefficient information (each coefficient information being generated by frequency analysis) outputted from the wavelet transformation unit 802 are supplied to the digital watermark extracting unit 803.

Utilizing the extracting parameter information 109, the digital watermark extracting unit 803 extracts the digital watermark information 107 embedded in the coefficient information outputted from the wavelet transformation unit 802. The detailed functions of the digital watermark extracting unit 803 will be explained later.

The digital watermark information 107 extracted in the digital watermark extracting unit 803 is supplied to a display unit 705. Also the coefficient information after the extraction of the digital watermark information 107 is supplied to an inverse wavelet transformation unit 804, which executes a process similar to that executed by the aforementioned inverse wavelet transformation unit 104.

Data transformed into the original image data in the inverse wavelet transformation unit 804 are supplied to the display unit 805.

The display unit 805 can synthesize the image data and the displayable digital watermark information 107 which has been embedded therein and visually display these data on a same image screen. In case the extracting process in the digital watermark extracting unit 803 is incapable of detecting proper digital watermark information 107 or detects forging of the synthesized image data 110, an alarm signal generated by a control unit 806 may be displayed in superposition with the image data.

The information processing apparatus 800 may be provided with a printing unit in addition to the display unit. In such case, the printing unit synthesizes and prints the image data and the displayable digital watermark information 107 that has been embedded therein on a same image field. Also, in case a forging is detected, the printing unit synthesizes and prints the image data and the alarm signal, generated by the control unit 806, on a same image field.

Referring to FIG. 8, the information processing apparatus 800 is provided with a control unit 806 for controlling the functions of various process units and a recording medium 807 for storing program codes readable by the control unit 806. In particular, the recording medium 807 stores program code that realize the functions of the first embodiment by controlling the functions of the digital watermark extracting unit 803.

(5) Digital Watermark Extracting Unit 803

Figure 9:
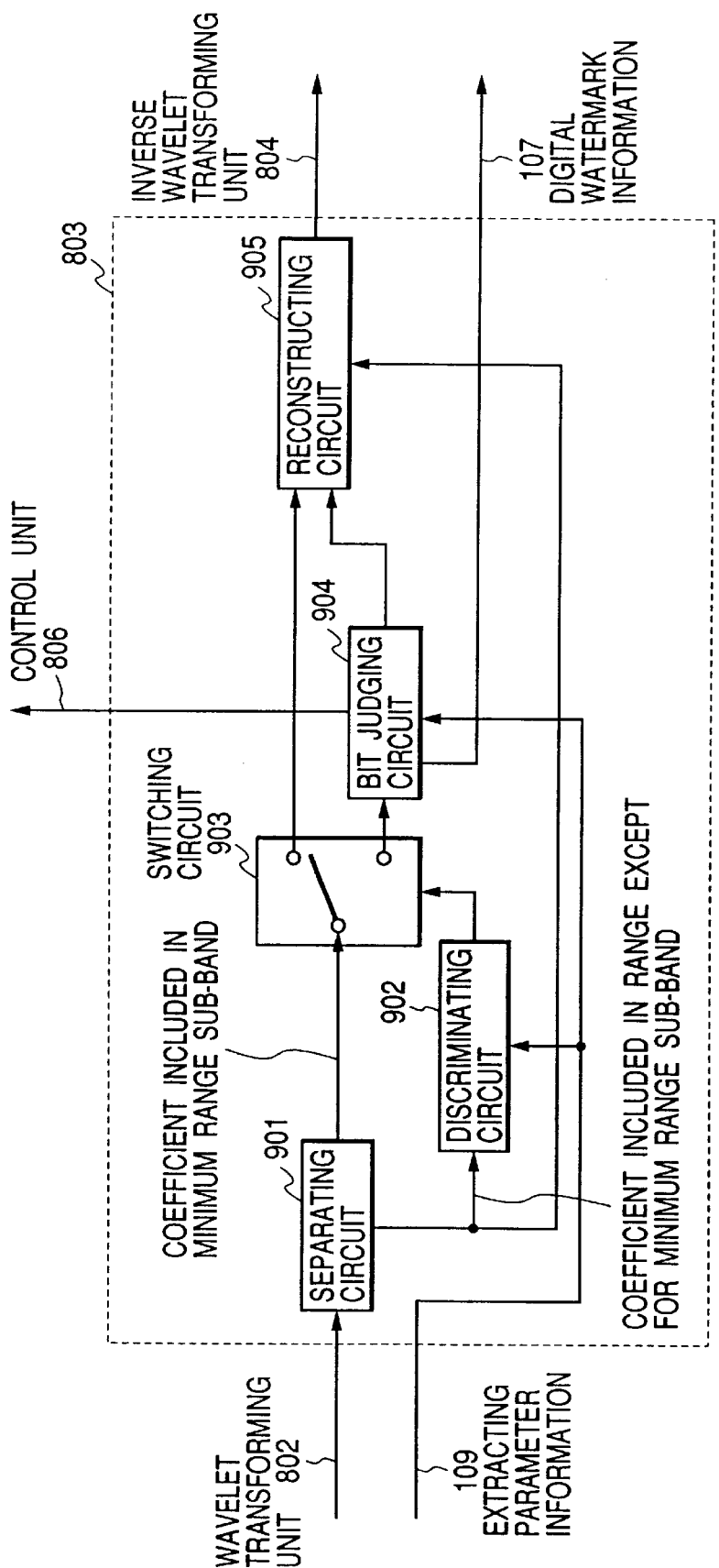
FIG. 9 is a block diagram showing the configuration of a digital watermark extraction circuit 803 of the first embodiment.

In the following there will be explained, with reference to FIG. 9, detailed functions of the digital watermark extracting unit 803.

At first, the synthesized image data 110, obtained by dividing into one or more blocks and executing the wavelet transformation for each block, are supplied from the wavelet transformation unit 802 to a separating circuit 901.

The separating circuit 901 separates, in each of plural trees contained in each block, the coefficient information constituting such tree into the coefficient information contained in the minimum range sub band (LL) and the plural coefficient information contained in other sub bands.

The separating circuit 901 sends the coefficient information contained in the minimum range sub band to a switching circuit 903 and the coefficient information contained in the sub bands other than the minimum one to a discriminating circuit 902.

The discriminating circuit 902 executes, for each tree, a predetermined operation on the plural coefficient information supplied from the separating circuit 901, thereby discriminating whether the coefficient information contained in the minimum range sub band contains the digital watermark information 107.

In the first embodiment, the discriminating circuit 902 executes an operation corresponding to the discriminating circuit 502 provided in the digital watermark embedding unit 103. More specifically, for each tree, it calculates the sum of the absolute values of the plural coefficient information contained in the sub bands other than the minimum one and compares the result of such operation with a predetermined threshold value (contained in the extracting parameter information 109).

The discriminating circuit 902 compares the sum of the absolute values in each tree with the predetermined threshold value, and judges that the digital watermark information 107 is embedded in the coefficient information contained in the minimum range sub band of a free for which such threshold value is exceeded. The result of discrimination is supplied to a switching circuit 903 and controls the function thereof.

In case the digital watermark information 107 is embedded according to a predetermined embedding pattern, the discriminating circuit 902 specifies the embedded pattern utilizing the embedding parameter information contained in the extracting parameter information 109, and controls the switching circuit 903 according to the specified result.

The coefficient information contained in the minimum range sub band in a tree for which the threshold value is exceeded is supplied, through the switching circuit 903, to a bit judging circuit 904. On the other hand, the coefficient information contained in the minimum range sub band in a tree for which the threshold value is not exceeded is supplied, through the switching circuit 903, to a reconstructing circuit 905.

The bit judging circuit 904 executes a calculation on the coefficient information (contained in the minimum range sub band) supplied through the switching circuit 903, and, based on the result of calculation, detects the 1-bit information constituting the digital watermark information 107.

More specifically, the bit judging circuit 904 divides the entered coefficient information by the corresponding quantizing step to determine a quantizing index, and judges the embedded bit information according to the following rules, utilizing thus determined quantizing index:

(1) The embedded information is "0" if the quantizing index is an even number;
(2) The embedded information is "1" if the quantizing index is an odd number.

By executing the above-described operation in succession on the trees for which the threshold value is exceeded, the bit judging circuit 904 can extract all the bit train constituting the digital watermark information 107.

The bit judging circuit 904 supplies the control unit 806 with the digital watermark information extracted from each block. In case the digital watermark information embedded in each block contains two-dimensional information for detecting forging, the bit judging circuit 904 judges the forging of the synthesized image data 110, utilizing such digital watermark information. The result of judgment is supplied to the control unit 806 and is displayed on the display unit 805 when necessitated.

The method for detecting the forging of the synthesized image data 110 is not limited to the process mentioned above. For example, the digital watermark extracting unit 803 can also detect the forging by holding in advance the digital watermark information 107 embedded in the synthesized image data 110 and comparing it with the result of extraction by the bit judging circuit 904.

The coefficient information after extraction of the digital watermark information 107 in the bit judging circuit 904 is supplied to the reconstructing circuit 905.

The reconstructing circuit 905 reconstructs the tree structure shown in FIG. 4 by synthesizing the coefficient information (supplied from the switching circuit 903 or the bit judging circuit 904) contained in the minimum range sub band corresponding to each tree and the coefficient information (supplied from the separating circuit 901) contained in the sub bands other than the minimum one. The output of the reconstructing circuit 905 is supplied, as the output of the digital watermark extracting unit 903, for each block, to the inverse wavelet transformation unit 804.

In the first embodiment, in case of for example image data, as explained in the foregoing, the information determining the embedding position of the digital watermark information (namely the plural coefficient information contained in the sub bands other than the minimum one) is different from the information in which the digital watermark information itself is embedded (namely the coefficient information contained in the minimum range sub band in each tree). The embedding process utilizing such plural different information allows to increase the freedom of embedding process. Also it is rendered possible to embed the digital watermark information while maintaining the feature of the information for determining the embedding position.

Also in the first embodiment, it is possible to independently set the parameter information determining the information amount of the digital watermark information (namely the predetermined threshold value to be used in the discriminating circuit 502) and the parameter information determining the resistance to the attack or the level of image quality deterioration (namely the magnitude of the quantizing step to be used in the quantizing circuit 504). It is therefore possible to arbitrary select the balance of the resistance of the digital watermark information of the predetermined information amount and the quality of the synthesized image.

Second Embodiment

The first embodiment has provided a configuration which, giving emphasis in increasing the resistance of the synthesized image containing the embedded digital watermark information against attack, determines the embedding position of the digital watermark information based on the coefficient information contained in the sub bands other than the minimum range sub band and embeds the digital watermark information 107 in the coefficient information contained in the minimum range sub band.

In contrast, in order to reduce the deterioration in the image quality of the synthesized image and to maintain a higher quality of the original image, the second embodiment provides a configuration of determining the embedding position of the digital watermark information utilizing the coefficient information contained in the minimum range sub band and embedding the digital watermark information in the plural coefficient information contained in the sub bands other than the minimum one.

In the following there will be explained, with reference to FIGS. 1 and 10, the configuration of an information processing apparatus of the second embodiment. In the second embodiment, the digital watermark embedding unit 103 shown in FIG. 1 has a configuration different from that in the first embodiment. In the second embodiment, therefore, the explanation will be given only to the process unit different from the first embodiment (namely the digital watermark embedding unit), while other process units are same as those in the first embodiment and will not be explained further.

(1) Digital Watermark Embedding Unit 1000

Figure 10:
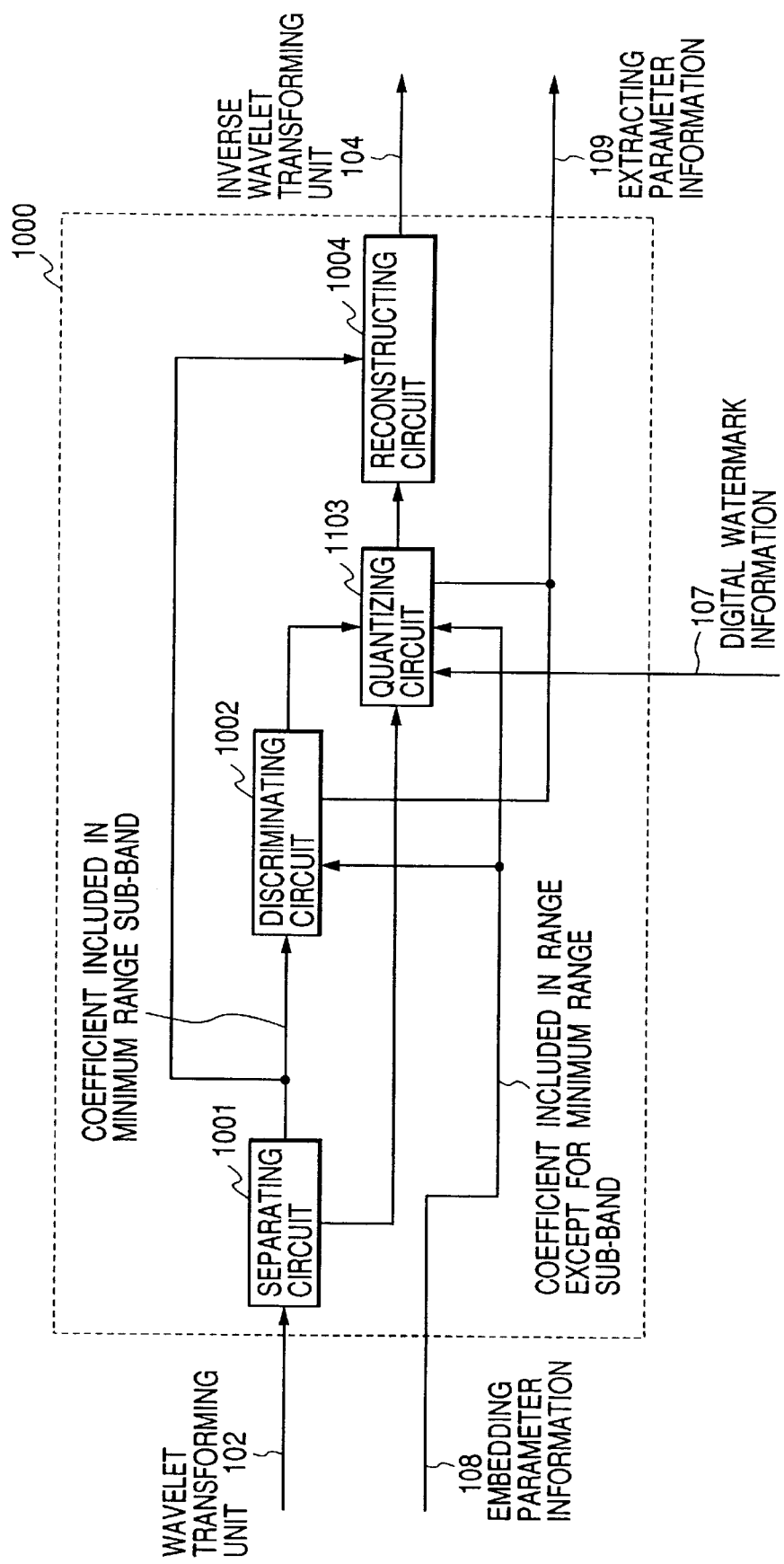
FIG. 10 is a block diagram showing the configuration of a digital watermark embedding unit 1000 in a second embodiment.
Figure 11:
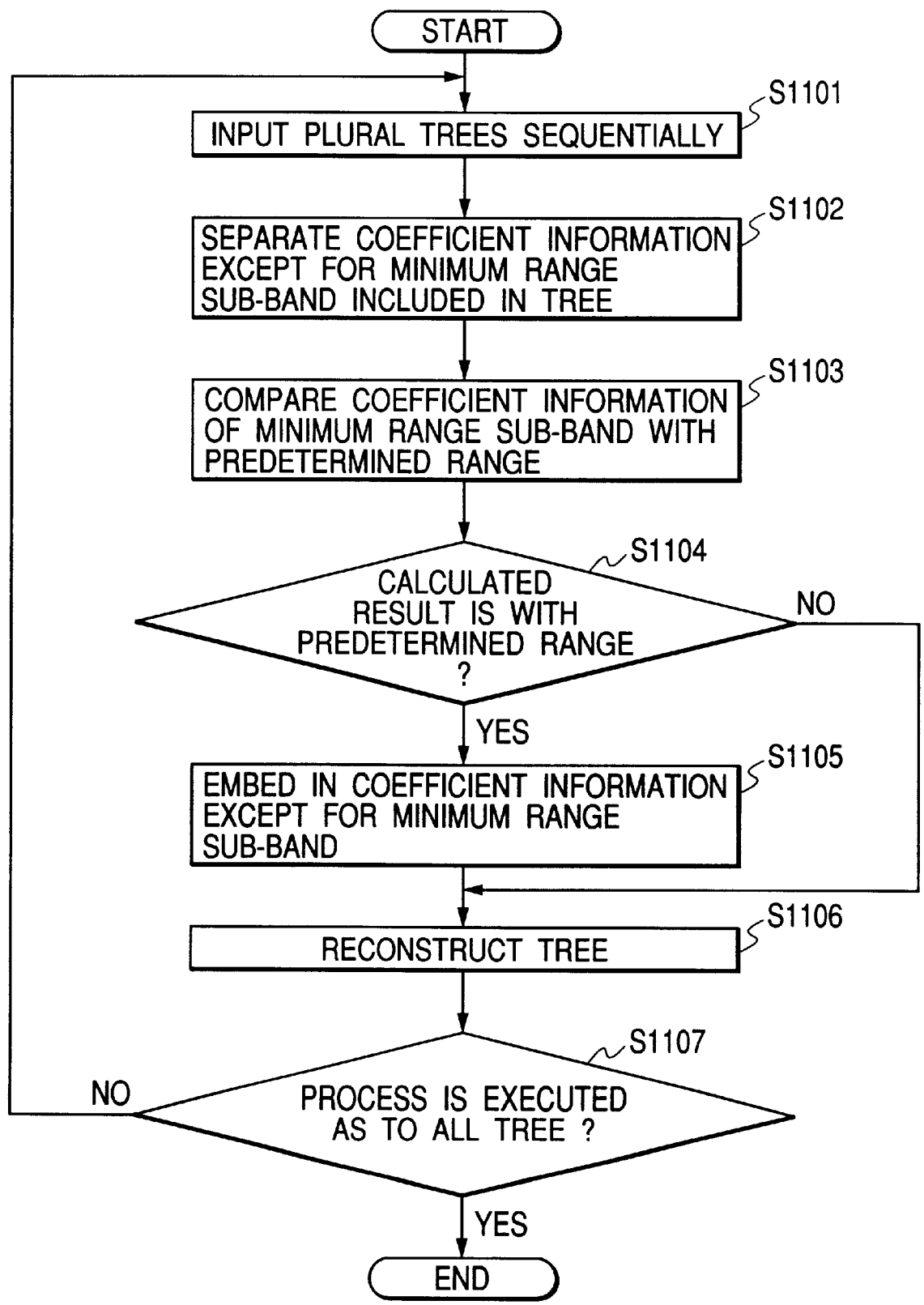
FIG. 11 is a flow chart showing the function of the digital watermark embedding unit 1000 in the second embodiment.
Figure 12:
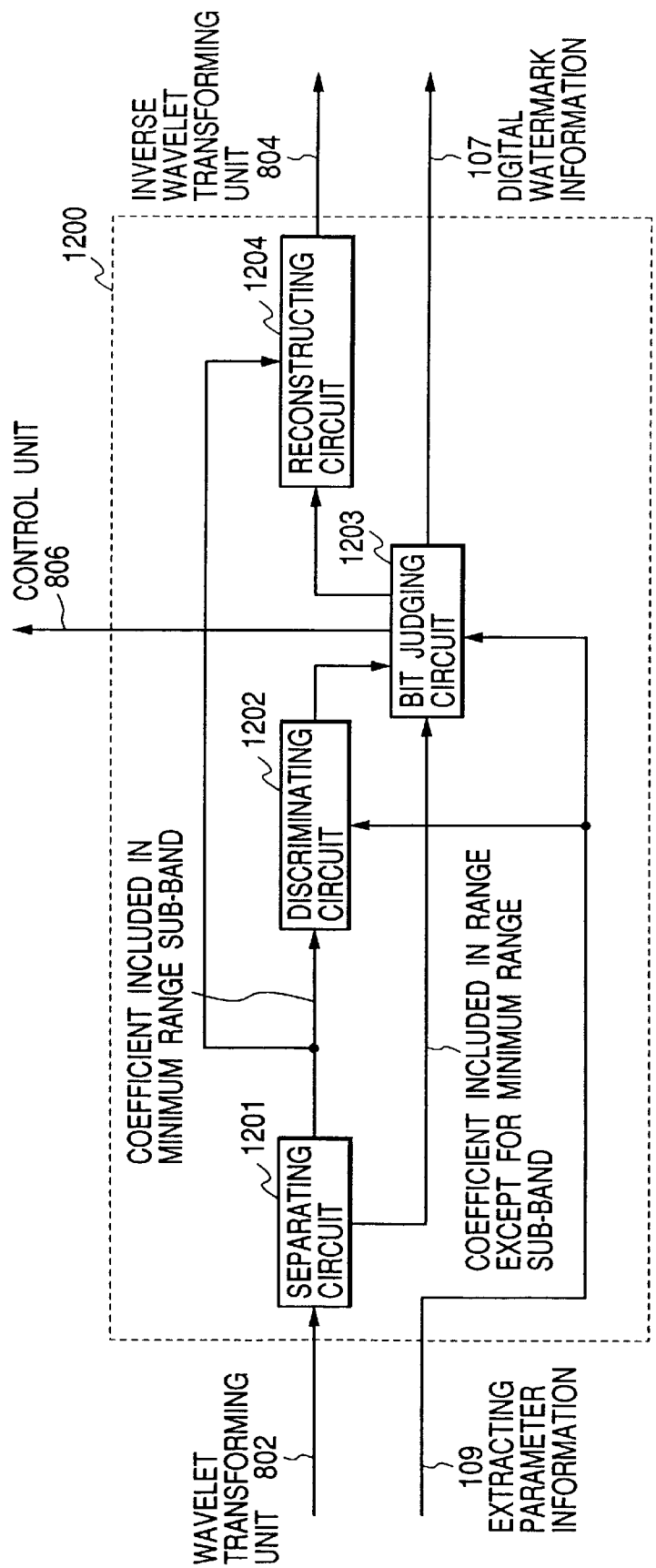
FIG. 12 is a block diagram showing the configuration of a digital watermark extraction unit 1200 of the second embodiment.

FIG. 10 is a block diagram showing the detailed configuration of a digital watermark embedding unit 1000 in the second embodiment, and FIG. 11 is a flow chart showing the function thereof.

In a step S1101, a separating circuit 1001 enters, in succession, plural trees (each tree being composed of a group of plural coefficient information corresponding to plural sub bands) contained in each of one or more blocks (or areas) subjected to the wavelet transformation in the wavelet transformation unit 102.

In a step S1102, the separating circuit 1001 separates the plural coefficient information constituting each tree into the coefficient information contained in the minimum range sub band (LL) and the plural coefficient information contained in the sub bands other than the minimum one.

Subsequently the separating circuit 1001 sends the coefficient information contained in the minimum range sub band to the discriminating circuit 1002 and the plural coefficient information contained in other sub bands to a quantizing circuit 1003.

In a step S1103, the discriminating circuit 1002 discriminates whether or not to embed the digital watermark information 107, utilizing the coefficient information contained in the minimum range sub band, and embeds the watermark information in the coefficient information not contained in the minimum range sub band.

More specifically, the discriminating circuit 1002 determines the embedding position of the digital watermark information by generating a histogram of the coefficient information contained in the minimum range sub band and dividing these coefficients based on such histogram. The function of the discriminating circuit 1002 will be explained in the following.

The coefficient information contained in the minimum range sub band in each tree will be represented as $x\_i$, wherein i is a natural number assigned to each coefficient information contained in the minimum range sub band.

For such coefficient information $x\_i$, there is set a predetermined range from $a\_j$ to $a\_j+L$, wherein $a\_j$ is a coefficient information larger than the minimum value but smaller than the maximum value of all the coefficient information contained in the minimum range sub band, while L is a natural number indicating the width of the range, and j is a natural number sequentially given within the range. Also $a\_j$ and $a\_j+L$ satisfy a relation $a\_(j+1)=a\_j+L+1$.

In the second embodiment, information indicating the above-mentioned predetermined range (namely $a\_j$ and $a\_j+L$) is one of the information contained in the embedding parameter information 108. The value L defining the above-mentioned predetermined range is a parameter influencing the number of the coefficient information $x\_i$ to be embedded and also determining the information amount of the embeddable digital watermark information.

In a step S1104, the discriminating circuit 1102 pays attention only to x i satisfying a condition $a\_j<x\_i<a\_j+L$. Then it selects a tree corresponding to at least a coefficient information $x\_i$ selected by the above-mentioned condition, and recognizes the coefficient information constituting each tree and not contained in the minimum range sub band (namely plural coefficient information other than $x\_i$) as the object of embedding.

The result of such recognition, namely the information designating the tree for embedding is supplied to a quantizing circuit 1003. Also the predetermined range used in the discriminating circuit 1002 is supplied to the exterior, as one of the extracting parameter information 109 required for extracting the digital watermark information 107 from the synthesized image 110.

In the second embodiment, the control unit 111 can also adaptively vary the predetermined range to be used by the discriminating circuit 1002, according to the feature of the image data or of the blocks. Thus the control unit 111 can variably control the embeddable information amount.

In a step S1105, the quantizing circuit 903 embeds a bit train of at least a bit, constituting the digital watermark information 107, into one or more coefficient information contained in the tree recognized as the object of embedding (namely coefficient information other than x_i in each tree).

The quantizing circuit 1003 embeds 1-bit information into the coefficient information constituting the object of embedding, by a method similar to that employed by the quantizing circuit 504 in the first embodiment, namely by the quantization method.

The magnitude of the quantizing step, controlling the embedding process by the quantization method, is one of the embedding parameter information 108. Such magnitude of the quantizing step is a parameter including the image quality, the deterioration in the quality of the synthesized image can be suppressed by decreasing the magnitude of the quantizing step. Such decrease in the magnitude of the quantizing step reduces the resistance, based on the relationship between the image quality and the resistance.

In the second embodiment, the control unit 111 can arbitrarily set the quantizing step to be used in the quantizing circuit 1003, according to the feature of the image data or the blocks. The value of the quantizing step used in the quantizing circuit 1003 is supplied to the exterior, as one of the extracting parameter information 109 required for extracting the digital watermark information 107 from the synthesized image data 110.

The quantizing circuit 1003 selects, according to a predetermined method, the coefficient information in which the watermark information is to be actually embedded, from one or more coefficient information contained in a tree. For example, the 1-bit information may be embedded in the n-th largest one among the absolute values of one or more coefficient information contained in each tree, based on the output n of a random number generator provided in the quantizing circuit 1003, wherein n is a random natural number outputted by the random number generator.

Also, as another example of such predetermined method, it is possible to embed the 1-bit information in each of plural coefficient information contained in the predetermined higher sub bands.

The coefficient information subjected to the embedding process in the quantizing circuit 1003 is supplied to a reconstructing circuit 1004.

In a step S1106, a reconstructing circuit 1004 synthesizes the coefficient information (supplied from the separating circuit 1001) contained in the minimum range sub band corresponding to each tree and the coefficient information (supplied from the quantizing circuit 1003) contained in the sub bands other than the minimum one to reconstruct the tree structure shown in FIG. 4. The output of the reconstructing circuit 1004 is supplied, as the output of the digital watermark embedding unit 1000, for each block, to an inverse wavelet transformation circuit 104.

By executing the above-described process for all the trees, the digital watermark information 107 can be embedded in the coefficient information contained in the sub bands other than the minimum one in each tree (step S1107). It is thus rendered possible to minimize the deterioration in the image quality of the original image and to elevate the resistance against the attack by the user as far as possible.

In the second embodiment, as explained in the foregoing, for example in the multi-value image data 106, the information determining the embedding position of the digital watermark information 107 (namely the coefficient information contained in the minimum range sub band in each tree) is different from the information in which the digital watermark information 107 itself is to be embedded (namely the plural coefficient information contained in the sub bands other than the minimum range sub band in each tree).

Also in the second embodiment, it is possible to independently set the parameter information determining the information amount of the digital watermark information 107 (namely the predetermined range to be used in the discriminating circuit 1002) and the parameter information determining the resistance against attack or the level of image quality deterioration (namely the magnitude of the quantizing step to be used in the quantizing circuit 1003).

The digital watermark embedding unit 1000 of the second embodiment so controls as to select all the coefficient information contained in the sub bands other than the minimum range sub band in each tree as the object of embedding, but such form is not restrictive. It is also possible to select plural sub bands, contained in the middle and high range sub bands, as the object of embedding.

Also the digital watermark embedding unit 1000 of the second embodiment so controls as to embed the digital watermark information in all the trees recognized as the object of embedding, but it is also possible, as in the first embodiment, to execute embedding in predetermined trees instead of all the trees.

For example it is also possible, as illustrated in FIGS. 7A to 7C in relation to the first embodiment, to adaptively vary the embedded pattern within the embeddable area in the predetermined block.

In such case, the embedded pattern is variably selected according to the information amount of the digital watermark information 107, number of trees in which the embedding is possible, magnitude of the predetermined coefficient information in the predetermined sub bands contained in the tree in which embedding is possible, magnitude of the coefficient information contained in the sub band constituting the object of embedding, structure of the two-dimensional information for detecting forging etc. The embedding pattern information is supplied, as one of the extracting parameter information 109, to the output unit 105.

In the following there will be explained, with reference to FIGS. 8 and 13, the configuration of an information processing apparatus of the second embodiment. In the second embodiment, the digital watermark embedding unit 803 shown in FIG. 8 has a configuration different from that in the first embodiment. In the second embodiment, therefore, the explanation will be given only to the process unit different from the first embodiment (namely the digital watermark embedding unit), while other process units are same as those in the first embodiment and will not be explained further.

(2) Digital Watermark Extracting Unit 1200

Figure 13:
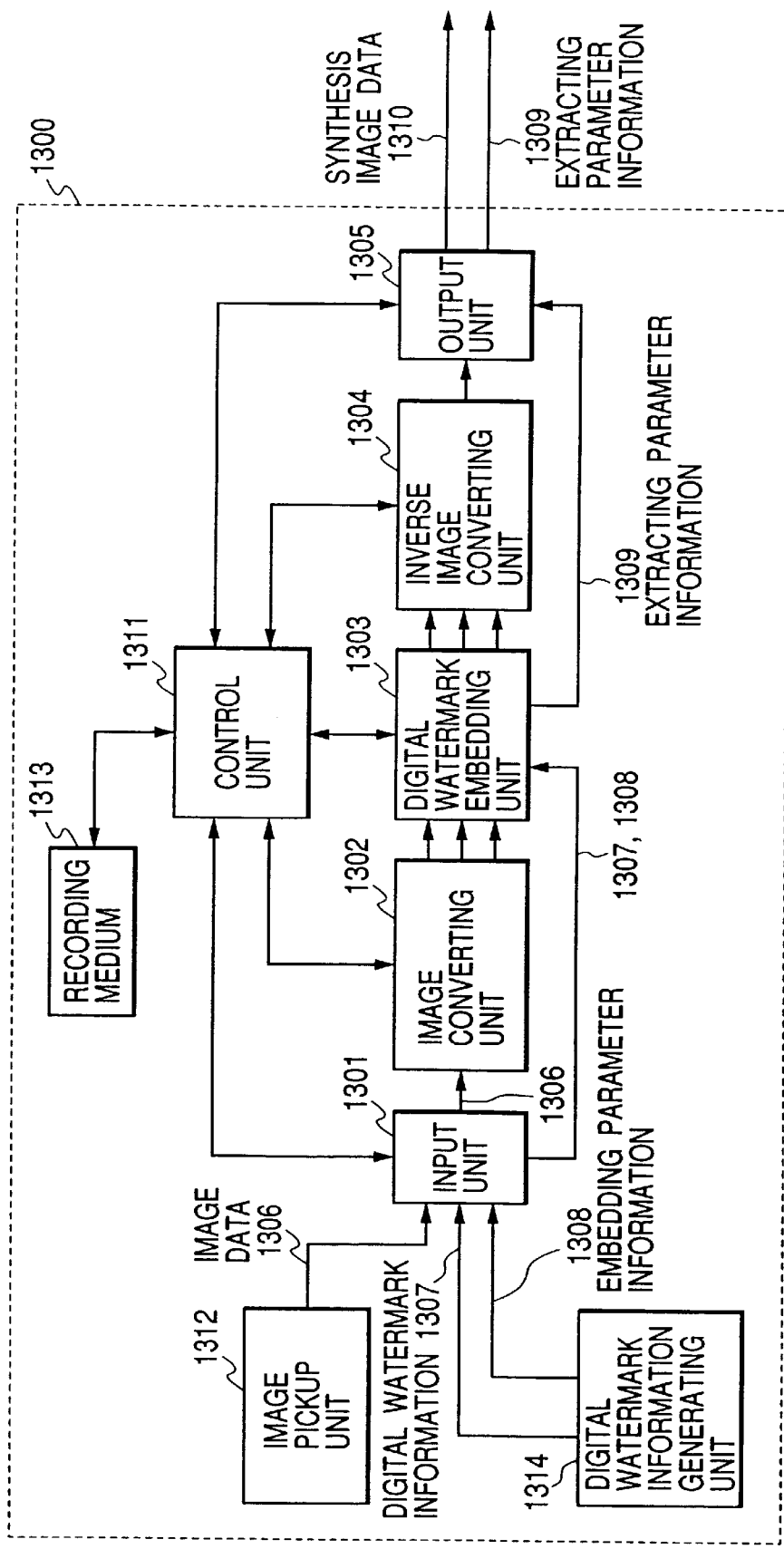
FIG. 13 is a block diagram showing the configuration of an information processing apparatus 1300 in a third embodiment.

FIG. 13 is a block diagram showing the detailed configuration of a digital watermark extracting unit 1200 in the second embodiment.

Referring to FIG. 13, the synthesized image data 110 obtained by division into one or more blocks and by wavelet transformation for each block are supplied from the wavelet transformation unit 802 to a separating circuit 1201.

The separating circuit 1201 separates, for each of the plural trees contained in each block, the coefficient information constituting the tree into the coefficient information contained in the minimum range sub band (LL) and the plural coefficient information contained in the sub bands other than the minimum one.

The separating circuit 1201 sends the coefficient information contained in the minimum range sub band to a discriminating circuit 1202, and the coefficient information contained in other sub bands to a bit judging circuit 1203.

The discriminating circuit 1202 discriminates, utilizing information indicating a predetermined range contained in the extracting parameter information 109, whether the coefficient information contained in the minimum range sub band of each tree is within the above-mentioned predetermined range. The discriminating circuit 1202 judges that the digital watermark information 107 is contained in the plural coefficient information other than that in the minimum range sub band, contained in the tree of which the above-mentioned coefficient information is within the predetermined range.

Based on the result of judgment, the discriminating circuit 1202 controls the function of a bit judging circuit 1203.

The bit judging circuit 1203 executes an operation on the coefficient information (plural coefficient information contained in the sub bands other than the minimum one) supplied from the separating circuit 1201, utilizing the magnitude of the quantizing step contained in the extracting parameter information 109, and detects n-bit information constituting the digital watermark information 107 based on the result of such operation.

More specifically, the bit judging circuit 1203 determines the quantizing index by dividing the entered plural coefficient information with the corresponding quantizing step. Utilizing thus determined quantizing step, the bit judging circuit 1203 judges the embedded bit information according to the following rule:

(1) The embedded information is "0" if the quantizing index is an even number;
(2) The embedded information is "1" if the quantizing index is an odd number.

By executing the above-described operation in succession on the tree contained in the aforementioned predetermined range, the bit judging circuit 1203 can extract all the bit train constituting the digital watermark information 107.

The bit judging circuit 1203 supplies the control unit 806 with the digital watermark information extracted from each block. In case the digital watermark information embedded in each block contains two-dimensional information for detecting forging, the bit judging circuit 1203 judges the forging of the synthesized image data 110, utilizing such digital watermark information. The result of judgment is supplied to the control unit 806 and displayed on the display unit 805 when necessitated.

The method of detecting forging of the synthesized image data 110 is however not limited to that described above. It is also possible to detect forging, for example, by a configuration in which the digital watermark extracting unit 1200 in advance holds the digital watermark information embedded in the synthesized image data 110 and compares it with the result of extraction by the bit judging circuit 1203.

The coefficient information of each tree from which the digital watermark information is extracted by the bit judging circuit 1203 are supplied to a reconstructing circuit 1204.

The reconstructing circuit 1204 reconstructs the tree structure shown in FIG. 4 by synthesizing the coefficient information (supplied from the separating circuit 1201) contained in the minimum range sub band corresponding to each tree and the coefficient information (supplied from the bit judging circuit 1203) contained in the sub bands other than the minimum one. The output of the reconstructing circuit 1204 is supplied, as the output of the digital watermark extracting unit 1200, for each block, to the inverse wavelet transformation unit 804.

In the second embodiment, in case of for example image data, as explained in the foregoing, the information determining the embedding position of the digital watermark information (namely the coefficient information contained in the minimum range sub band) is different from the information in which the digital watermark information itself is embedded (namely the plural coefficient information contained in the sub bands other the minimum one). The embedding process utilizing such plural different information allows to increase the freedom of embedding process. Also it is rendered possible to embed the digital watermark information while maintaining the feature of the information for determining the embedding position.

Also in the second embodiment, it is possible to independently set the parameter information determining the information amount of the digital watermark information (namely the predetermined range to be used in the discriminating circuit 1002) and the parameter information determining the resistance to the attack or the level of image quality deterioration (namely the magnitude of the quantizing step to be used in the quantizing circuit 1003). It is therefore possible to arbitrary select the balance of the resistance of the digital watermark information of the predetermined information amount and the quality of the synthesized image.

Third Embodiment

The first and second embodiments have disclosed configurations for dividing the multi-value image data 106 of an image field into one or more blocks (for areas of predetermined sizes), executing wavelet transformation on each block, and embedding the digital watermark information 107, in the wavelet transformed area, in the predetermined coefficient information contained in the blocks.

In contrast, the third embodiment provides a configuration of dividing the multi-value color image data of an image field into information signals of one or more kinds, and embedding the digital watermark information in at least one of such information signals.

(1) Information Processing Apparatus 1300

FIG. 13 is a block diagram showing the configuration of an information processing apparatus 1300 of the third embodiment, adapted to embed predetermined digital watermark information 1307 into multi-value color image data 1306. In the third embodiment, the information processing apparatus 1300 is provided with image pickup means such as a digital camera, a camera-integrated video tape recorder or a scanner.

At first there will be briefly described the functions of the information processing apparatus 1300.

Referring to FIG. 13, data received by an input unit 1301 include multi-value color image data 1306 including red, green and blue components in each pixel, digital watermark information 1307, and embedding parameter information 1308 required in embedding the digital watermark information 1307.

The multi-value color image data 1306 are still image data or moving image data taken by an image pickup unit 1312. In case of moving image data, the data are supplied to the input unit 1312 in the unit of a predetermined number of image fields. The image pickup unit 1312 is provided at least a lens and at least an image pickup element, converts the optical image of an object into plural electrical signals including red, green and blue components utilizing these and supplies the input unit 1301 with such electrical signals as multi-value color image data.

The digital watermark information 1307 contains at least one of the copyright information, personal information of the user (for example name, age, telephone number or e-mail address), information on the multi-value color image data (for example location of image taking, date and time of image taking or specific comment by the user), information on the information processing apparatus 1300 (for example maker name or model name), image information including a predetermined mark (for example emblem, logo or stamp) and two-dimensional information for detecting forging (for example a point-symmetrical or line-symmetrical mark). Such information is either held in a digital watermark generation unit 1314 or generated therein by the user.

The multi-value color image data 1306 entered into the input unit 1301 are supplied to an image conversion unit 1302. Also the digital watermark information 1307 and the embedding parameter information 1308 entered into the input unit 1301 are supplied to a digital watermark embedding unit 1303.

The image conversion unit 1302 converts the multi-value color image data, supplied from the input unit 1301, into plural signal components which are composed of a luminance signal component and two color difference signal components.

More specifically, the image conversion unit 1302 converts the multi-value color image data 1306, of which each pixel is composed of red, green and blue components, into a luminance signal component and two color difference signal components according to the following equations:

$$Y = 0.2988 \times R + 0.5869 \times G + 0.1143 \times B$$

$$Cr = 0.713 \times (R-Y)$$

$$Cb = 0.564 \times (B-Y)$$

wherein Y is a value indicating the magnitude of the luminance signal component; Cr and Cb are those of the color difference signal components; R is that of the red component; G is that of the green component; and B is that of the blue component.

Also the image conversion unit 1302 executes sampling of the color difference signal components Cr, Cb when necessitated, thereby achieving conversion to color difference signal components Cr, Cb in the unit of N pixels (N being an integer larger than 1).

The plural signal components (luminance signal component Y and two color difference signal components Cr, Cb) outputted from the image conversion unit 1302 are supplied to the digital watermark embedding unit 1303.

The digital watermark embedding unit 1303 embeds the digital watermark information 1307 into at least one signal component outputted from the image conversion unit 102, utilizing the embedding parameter information 1308. The detailed functions of the digital watermark embedding unit 1303 will be explained later.

The digital watermark embedding unit 1303 supplies an inverse image conversion unit 1304 with the plural signal components of which a part contains the embedded digital watermark information 1307. The digital watermark embedding unit 1303 also supplies an output unit 1305 with the extracting parameter information 1309, required for extracting the digital watermark information 1307 from the above-mentioned signal components.

The inverse image conversion unit 1304 executes a process corresponding to the conversion process of the image conversion unit 1304, on the plural signal components supplied from the digital watermark embedding unit 1303, and sends the resulting synthesized image data 1310 to the output unit 1305.

The output unit 1305 outputs, to the exterior, the synthesized image data 1310 containing the embedded digital watermark information 1307 and the extracting parameter information 1309 required for extracting the digital watermark information 1307 from the synthesized image data 1310.

The output unit 1305 may execute the output for example to a bus-type transmission channel through a digital interface based on the IEEE1394 standard, or to a wireless transmission channel through a wireless interface of an infrared communication method.

Also referring to FIG. 13, the information processing apparatus 1300 is provided with a control unit 1311 for controlling the functions of various process unit provided in the apparatus and a recording medium 1313 for storing program codes readable by the control unit 1311.

(2) Digital Watermark Embedding Unit 1303

Figure 14:
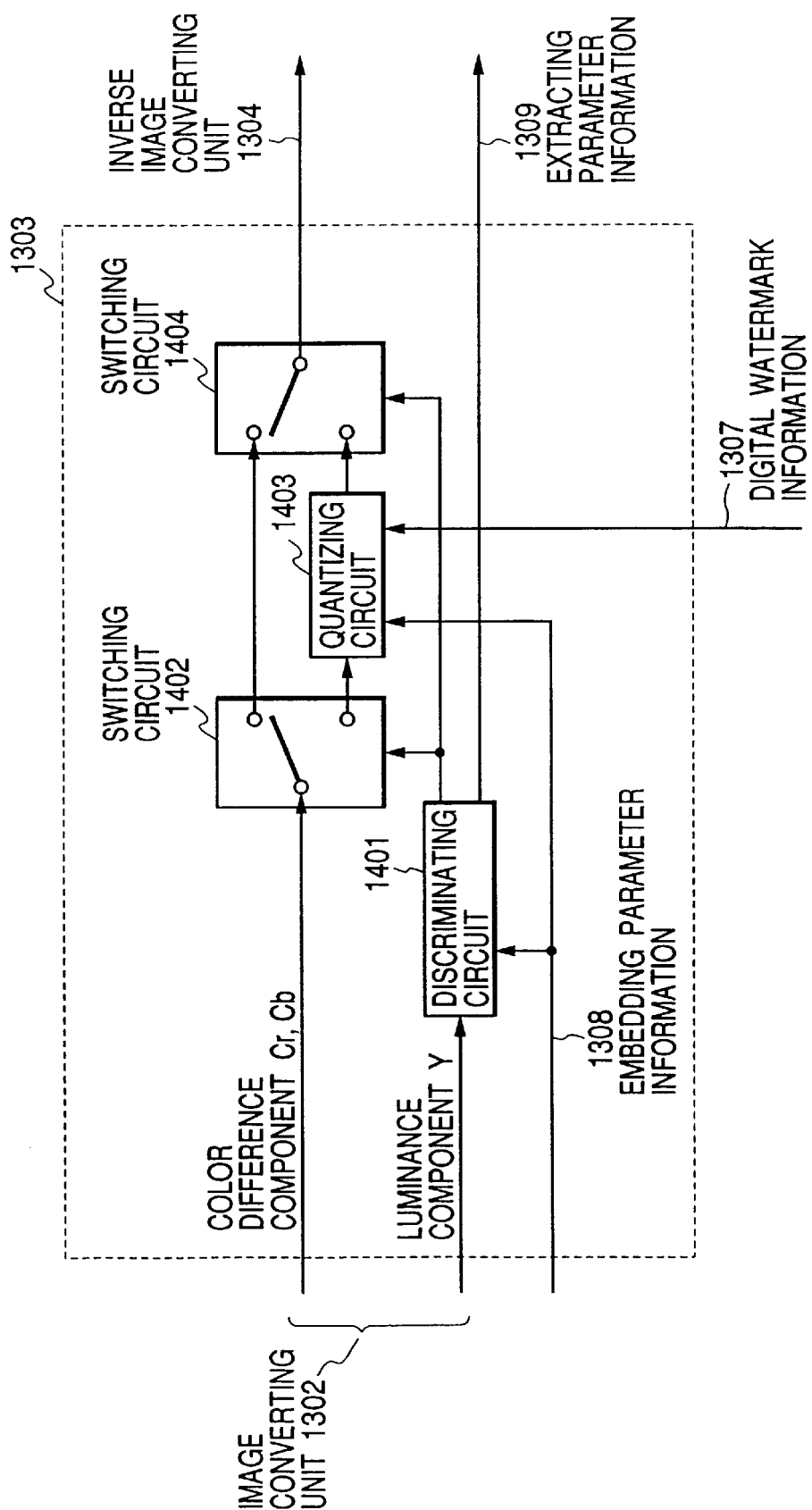
FIG. 14 is a block diagram showing the configuration of a digital watermark embedding unit 1303 in the third embodiment.
Figure 15:
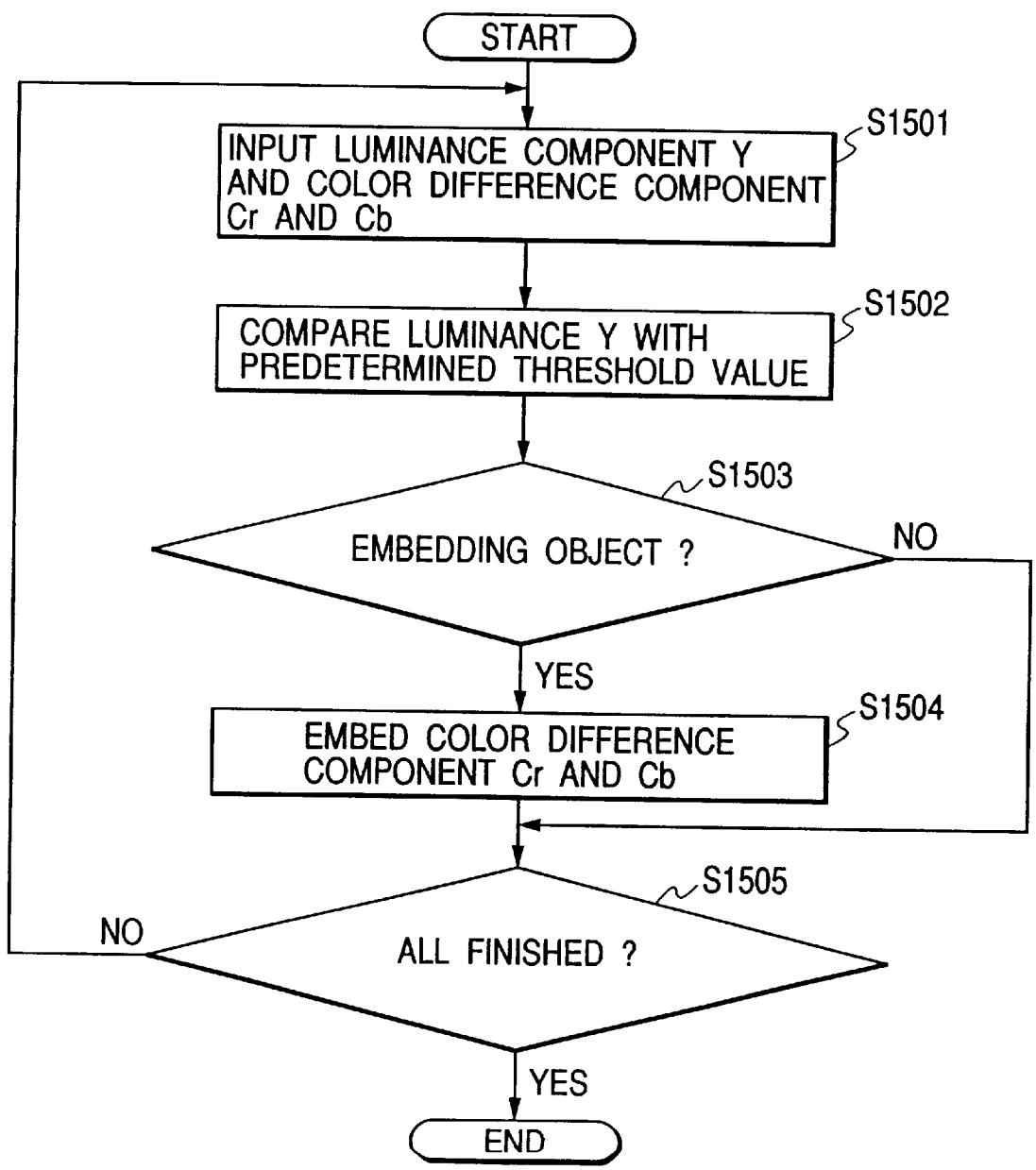
FIG. 15 is a flow chart showing the function of the digital watermark embedding unit 1303 of the third embodiment.

In the following there will be explained, with reference to FIGS. 14 and 15, the detailed functions of the digital watermark embedding unit 1303. FIG. 14 is a block diagram showing the configuration of the digital watermark embedding unit 1303 of the third embodiment, and FIG. 15 is a flow chart showing the functions thereof.

In a natural image, the color difference signal components generally have a larger redundancy in comparison with the luminance signal component. The image quality is not much influenced visually even if the digital watermark information including a specified bit train is embedded in the redundant portion of such color difference signal components.

In the third embodiment, therefore, the digital watermark embedding unit 1303 determines, utilizing the luminance signal component Y, the spatial area in which the digital watermark information 1307 is to be embedded, and embeds the digital watermark information 1307 in the two color difference signal components Cr, Cb corresponding to thus determined spatial area.

In a step S1501, among the plural signal components supplied from the image conversion unit 1302, the luminance signal component Y is supplied to a discriminating circuit 1401 while the two color difference signal components Cr, Cb are supplied to a switching circuit 1402.

In steps S1502 and S1503, the discriminating circuit 1401 discriminates whether the luminance signal component Y of a pixel exceeds a predetermined threshold value, and recognizes the color difference signal components corresponding to the luminance signal component Y exceeding such threshold value, as the objects of embedding. There may also be adopted a process that the discriminating circuit 1401 discriminates whether the luminance signal component Y is within a predetermined range and recognizes the color difference signal components, corresponding to the luminance signal component Y within such predetermined range, as the object of embedding.

The above-mentioned predetermined threshold value or range is supplied to the discriminating circuit 1401, as one of the embedding parameter information 1308, and is a parameter information determining the information amount of the digital watermark information 1307. Also, the predetermined threshold value or range used in the discriminating circuit 1401 is supplied to the exterior, as one of the extracting parameter information 1309 required for extracting the digital watermark information 1307 from the synthesized image data 1310.

The control unit 1313 of the third embodiment can arbitrarily set the predetermined threshold value or range mentioned above, according to the feature of the image data.

The result of discrimination by the discriminating circuit 1401 is supplied to switching circuits 1404, 1402 and controls the functions thereof. The luminance signal component Y, processed in the discriminating circuit 1401, is supplied to the inverse image conversion unit 1304.

The switching circuit 1402 sends the color difference signal components Cr, Cb corresponding to the luminance signal component Y recognized as the object of embedding to a quantizing circuit 1403, and sends other color difference signal components Cr, Cb to a switching circuit 1404.

The quantizing circuit 1403 is so constructed as to embed, in a step S1504, the digital watermark information 1307 of a bit into the color difference signal components of a unit, thereby embedding the digital watermark information 1307 of at least a bit in the color difference signal components Cr, Cb in total.

More specifically, the quantizing circuit 1403 embeds the information of a bit into the color difference signal components Cr, Cb constituting the objects of embedding by a method similar to that employed by the quantizing circuit 504 in the first embodiment, namely by quantization.

The magnitude of the quantizing step controlling the embedding process of the quantizing circuit 1403 is one of the information contained in the embedding parameter information 1308. The magnitude of this quantizing step is a parameter influencing the image quality, and a decrease of the quantizing step allows to suppress the deterioration of the synthesized image data 1310. However, a decrease in the quantizing step reduces the resistance, because of the relationship between the image quality and the resistance.

Also in the third embodiment, the control unit 1313 can arbitrarily set the value of the quantizing step to be used by the quantizing circuit 1403, according to the characteristics of the image data. Furthermore, the quantizing step used in the quantizing circuit 1403 is supplied to the exterior, as one of the extracting parameter information 109 required for extracting the digital watermark information 1307 from the synthesized image data 1310.

By executing the above-described process on all the luminance component signals Y, it is rendered possible to embed the digital watermark information 107 of at least 1 bit into all the color difference component signals Cr, Cb (step S1505).

The color difference signal components Cr, Cb subjected to embedding process in the quantizing circuit 1403 are supplied to the inverse image conversion unit 1304.

In the third embodiment, as explained in the foregoing, for example in case of image data, the information determining the embedding position (namely the luminance signal component Y) is different from the information in which the digital watermark information itself is embedded (namely the color difference signal components Cr, Cb). The embedding process utilizing the presence of information of such plural kinds allows to increase the freedom of embedding process. Also it is rendered possible to embed the digital watermark information while securely maintaining the feature of the information for determining the embedding method and position.

Also in the third embodiment, it is possible to independently set the parameter information determining the information amount of the digital watermark information (namely the predetermined threshold value or range to be used in the discriminating circuit 1402) and the parameter information determining the resistance to the attack or the level of image quality deterioration (namely the magnitude of the quantizing step to be used in the quantizing circuit 1403). It is therefore possible to arbitrary select the balance of the resistance of the digital watermark information of the predetermined information amount and the quality of the synthesized image.

Also in the third embodiment, since the digital watermark information 1307 is embedded in the color difference signal components Cr, Cb, the embedding can be achieved without almost any visual deterioration of the original image.

In the third embodiment, there has been explained a configuration in which the quantizing circuit 1403 directly manipulates the luminance signal component Y and the color difference signal components Cr, Cb to embed the digital watermark information 1307 into the spatial area of the color difference signal components Cr, Cb, but such configuration is not restrictive.

For example it is also possible to provide the image conversion unit 1302 with an orthogonal transformation circuit and to apply orthogonal transformation such as discrete cosine transformation or wavelet transformation to the luminance signal component Y and the color difference signal components Cr, Cb. In such case, the quantizing circuit 1403 may embed the digital watermark information 1307 into predetermined frequency ranges of the color difference signal components Cr, Cb based on the orthogonally transformed luminance signal component Y.

Also in the third embodiment, the digital watermark embedding unit 1303 recognizes, as the object of embedding, all the color difference signal components Cr, Cb corresponding to the luminance signal component Y exceeding the aforementioned predetermined threshold value, but the embedding may also be conducted, as in the first embodiment, in the color difference signal components Cr, Cb corresponding to a predetermined luminance signal component Y.

It is also possible to variably control the embedded pattern in the embeddable range, as shown in FIGS. 7A to 7C.

The embedded pattern mentioned above is variably set for example according to the information amount of the digital watermark information 1307, number of embeddable trees, magnitude of the predetermined coefficient information contained in a predetermined sub band, configuration of the two-dimensional information for detecting forging etc. The embedding pattern information is supplied, as one of the extracting parameter information 1309, to the output unit 1305.

Also the third embodiment executes a process of determining the embedding position based on the luminance signal component Y and embedding the digital watermark information 1307 into the color difference signal components Cr, Cb corresponding to such embedding position, but such process is not restrictive.

It is also possible, for example, to determine the embedding position based on the color difference signal components Cr, Cb and to embed the digital watermark information 1307 into the luminance signal component Y corresponding to such embedding position. Such process allows to improve the resistance against attack, though the synthesized image data 1310 is somewhat deteriorated in quality in comparison with the original image.

Also, the third embodiment converts the red, green and blue components R, G, B supplied from the image pickup unit 1312 into the luminance signal component Y and the color difference signal components Cr, Cb, but such form is not restrictive.

For example it is also possible to embed the digital watermark information 1307 into at least one of the red, green and blue components R, G, B without conversion into the luminance signal component Y and the color difference signal components Cr, Cb. In such case, it is for example possible to determine the embedding position based on the red component R and to embed the digital watermark information 1307 into the green component G and the blue component B corresponding to such embedding position.

In the third embodiment, there has not been explained the information processing apparatus for extracting the digital watermark information 1307 embedded in the synthesized image data 1310, but such apparatus can for example be constructed similar to the information processing apparatus 800 shown in the first and second embodiments.

In such case, the digital watermark extracting unit 803 separates the luminance signal component Y and the color difference signal components Cr, Cb, and discriminates the color difference signal components Cr, Cb in which the digital watermark information 1307 is embedded, utilizing the luminance signal component Y and the extracting parameter information 1309. Then, utilizing the result of such discrimination, the digital watermark extracting unit 803 extracts the digital watermark information 1307 from the color difference signal components Cr, Cb.

Also as in the first embodiment, it is possible to detect, based on the extracted digital watermark information 1307, whether the synthesized image data 1310 have been forged.

Other Embodiments

The foregoing embodiments may also be realized in the following forms.

For example it is possible to supply the control unit 111, 806, 1311 (including a microcomputer) of the system or apparatus of the foregoing embodiments, with a recording medium 113, 807, 1313 recording the program codes of a software realizing the functions of the foregoing embodiments.

The foregoing embodiments can also be realized by a configuration in which the control unit 111, 806, 1311 of the system or apparatus of the foregoing embodiments reads the program codes stored in the recording medium 113, 807, 1313 and controls the function of the apparatus or system so as to realize the functions of the foregoing embodiments.

More specifically, a recording medium 113 or 1313 storing the program codes realizing the process and function of the first embodiment shown in FIG. 6, second embodiment shown in FIG. 11 or third embodiment shown in FIG. 15 is supplied to the control unit 111 or 1311 shown in FIG. 1 or 13. The control unit 111 or 1311 itself reads the program codes stored in such recording medium 113 or 1313 and controls the various process circuits of the information processing apparatus 100 or 1300, shown in FIG. 1 or 13, so as to realize the functions of the above-mentioned embodiments.

In such case, the program codes themselves read from the recording medium 113 or 1313 realize the functions of the aforementioned embodiments, and such recording medium storing the program codes constitutes a part of the present invention.

The recording medium 113, 807 or 1313 for supplying the program codes can be, for example, a floppy disk, a hard disk, an optical disk, a magnetooptical disk, a CD-ROM , a CD-R, a magnetic tape, a non-volatile memory card or a ROM.

The present invention also includes a case where an operating system or an application software functioning on the control unit 111, 806 or 1311 controls the function of the system or apparatus of the aforementioned embodiments under the instruction of the program codes read from the recording medium 113, 807 or 1313, thereby realizing the functions of the aforementioned embodiments.

The present invention further includes a case wherein the program codes read from the recording medium 113, 807 or 1313 are once stored in a memory provided in a function expansion board or a function expansion unit connected to the control unit 111, 806 or 1311, and a control unit provided in the function expansion board or the function expansion unit controls the function of the system or apparatus of the foregoing embodiments under the instruction of the program codes, thereby realizing the functions of the aforementioned embodiments.

The present invention may be embodied in various forms without departing from the spirit or principal 10 character thereof.

In the first and second embodiments, the multi-value image data 10 are subjected to the wavelet transformation and the digital watermark information 107 is embedded in the coefficient information obtained therefrom, but such control is not restrictive.

It is also possible, for example, to transform the multi-value image data 106 by an orthogonal transformation such as discrete cosine transformation, then, based on predetermined coefficient information obtained therefrom, selecting coefficient information different from such predetermined coefficient information and embedding the digital watermark information 107 in thus selected coefficient information.

Also in the first and second embodiments, the multi-value image data 106 are divided into one or more blocks and the digital watermark information 107 is embedded in each block, but such control is not restrictive.

It is also possible, for example, to select, based on the coefficient information contained in a predetermined block, a block different from the predetermined block and to embed the digital watermark information 107 only in thus selected block.

Also in the first to third embodiments, the embedding position is determined by a predetermined signal component constituting the image data and the digital watermark information is embedded in a signal component different from the predetermined signal component, but such control is not restrictive and a similar process may be applied to audio data or text data.

For example, in case of audio data, it is possible to determine the embedding position according to a medium range frequency component and to embed the digital watermark information in a low or high range frequency component.

Furthermore, the information processing apparatus 800 or 1300 of the first to third embodiments has been explained by a configuration integrated with the image pickup unit 112 or 1312, but such configuration is not restrictive. It is also possible to provide the input unit 101, 1301 of the information processing apparatus 100, 1300 with an external terminal and to enter a still or moving image taken by an external image pickup unit 112 or 1312.

Consequently, the aforementioned embodiments are mere examples in all respects, and must not be construed in restrictive manner.

As explained in the foregoing, the present invention allows to efficiently control the method of embedding or extracting the digital watermark information into or from digital information. It is also rendered possible, utilizing a fact that the digital information have components of different kinds, to individually manage the digital watermark information and the information indicating the method of embedding (or extracting) such digital watermark information.

Furthermore, in the information data composed of plural signal components, the present invention embeds the digital watermark information in a signal component different from the signal component for determining the embedding position of the digital watermark information, thereby increasing the freedom of the embedding process and thus realizing an embedding process of a higher resistance or a less deterioration.

The present invention also allows embedding of the digital watermark information without erasing or exaggerating the feature of the information determining the embedding position.

The present invention is subject to various modifications within the scope and spirit of the appended claims.

What is claimed is:

1. An information processing apparatus capable of embedding digital watermark information into digital information, comprising:
   input means for inputting digital information including signal components of plural kinds; and
   control means for controlling a method for embedding the digital watermark information into the signal component of a first kind contained in the signal components of said plural kinds, based on the signal component of a second kind contained in the signal components of said plural kinds.

2. An information processing apparatus according to claim 1, wherein said control means controls the method for embedding the digital watermark information into the signal component of said first kind, based not on the signal component of said first kind but on the signal component of said second kind.

3. An information processing apparatus according to claim 1, wherein the signal components of said plural kinds are mutually different frequency components.

4. An information processing apparatus according to claim 1, wherein the signal components of said plural kinds are a luminance component and color difference components.

5. An information processing apparatus according to claim 1, wherein the signal components of said plural kinds are mutually different color components.

6. An information processing apparatus according to claim 5, wherein the color components of said plural kinds include red, green and blue.

7. An information processing apparatus according to claim 1, wherein said control means controls an embedding position of the digital watermark information into the signal component of a first kind contained in the signal components of said plural kinds, based on the signal component of said second kind.

8. An information processing apparatus according to claim 1, wherein said control means controls an embedding pattern of the digital watermark information into the signal component of a first kind contained in the signal components of said plural kinds, based on the signal component of said second kind.

9. An information processing apparatus according claim 1, wherein said control means controls an embedding method of the digital watermark information into the signal component of a first kind contained in the signal components of said plural kinds, based on plural coefficients contained in the signal component of said second kind.

10. An information processing apparatus according to claim 1, wherein the digital information inputted by said input means is information obtained by applying wavelet transformation on image information.

11. An information processing method capable of embedding digital watermark information into digital information, comprising:
    an input step of inputting digital information including signal components of plural kinds; and
    a control step of controlling a method for embedding the digital watermark information into the signal component of a first kind contained in the signal components of said plural kinds, based on the signal component of a second kind contained in the signal components of said plural kinds.

12. A memory medium storing an information processing method capable of embedding digital watermark information into digital information, said method comprising:
    an input step of inputting digital information including signal components of plural kinds; and
    a control step of controlling the method for embedding the digital watermark information into the signal component of a first kind contained in the signal components of said plural kinds, based on the signal component of a second kind contained in the signal components of said plural kinds.

13. An information processing apparatus capable of embedding digital watermark information into digital information, comprising:
    input means for inputting digital information including signal components of plural kinds; and
    control means for controlling whether or not to embed the digital watermark information into the signal component of a first kind contained in the signal components of said plural kinds, based on the signal component of a second kind contained in the signal components of said plural kinds.

14. An information processing apparatus according to claim 13, wherein said control means controls whether or not to embed the digital watermark information into the signal component of said first kind, based not on the signal component of said first kind but on the signal component of said second kind.

15. An information processing apparatus according to claim 13, wherein the signal components of said plural kinds are mutually different frequency components.

16. An information processing apparatus according to claim 13, wherein the digital information inputted by said input means is information obtained by applying wavelet transformation on image information.

17. An information processing method capable of embedding digital watermark information into digital information, comprising:
    an input step of inputting digital information including signal components of plural kinds; and
    a control step of controlling whether or not to embed the digital watermark information into the signal component of a first kind contained in the signal components of said plural kinds, based on the signal component of a second kind contained in the signal components of said plural kinds.

18. A memory medium storing an information processing method capable of embedding digital watermark information into digital information, said method comprising:
    an input step of inputting digital information including signal components of plural kinds; and
    a control step of controlling whether or not to embed the digital watermark information into the signal component of a first kind contained in the signal components of said plural kinds, based on the signal component of a second kind contained in the signal components of said plural kinds.

19. An information processing apparatus comprising:

input means for inputting digital information in which digital watermark information is embedded, wherein said digital information is composed of signal components of plural kinds; and discrimination means for discriminating an embedding method of the digital watermark information into the signal component of a first kind, based on the signal component of a second kind contained in said digital information and different from said first kind.

20. An information processing apparatus according to claim 19, further comprising detection means for detecting the digital watermark information from the signal component of said first kind.

21. An information processing apparatus according to claim 19, wherein the signal components of said plural kinds are mutually different frequency components.

22. An information processing apparatus according to claim 19, wherein the signal components of said plural kinds are a luminance component and color difference components.

23. An information processing apparatus according to claim 19, wherein the signal components of said plural kinds are mutually different color components.

24. An information processing method comprising:

an input step of inputting digital information in which digital watermark information is embedded, wherein said digital information is composed of signal components of plural kinds; and a discrimination step of discriminating an embedding method of the digital watermark information into the signal component of a first kind, based on the signal component of a second kind contained in said digital information and different from said first kind.

25. A memory medium storing an information processing method, said method comprising:

an input step of inputting digital information in which digital watermark information is embedded, wherein said digital information is composed of signal components of plural kinds; and a discrimination step of discriminating the embedding method of the digital watermark information into the signal component of a first kind, based on the signal component of a second kind contained in said digital information and different from said first kind.

26. An information processing apparatus comprising:

input means for inputting digital information in which digital watermark information is embedded, wherein said digital information is composed of signal components of plural kinds; and discrimination means for discriminating whether the digital watermark information is embedded in the signal component of a first kind, based on the signal component of a second kind contained in said digital information and different from said first kind.

27. An information processing apparatus according to claim 26, further comprising detection means for detecting the digital watermark information from the signal component of said first kind.

28. An information processing apparatus according to claim 26, wherein the signal components of said plural kinds are mutually different frequency components.

29. An information processing apparatus according to claim 26, wherein the signal components of said plural kinds are a luminance component and color difference components.

30. An information processing apparatus according to claim 26, wherein the signal components of said plural kinds are mutually different color components.

31. An information processing method comprising:

an input step of inputting digital information in which digital watermark information is embedded, wherein said digital information is composed of signal components of plural kinds; and a discrimination step of discriminating whether the digital watermark information is embedded in the signal component of a first kind, based on the signal component of a second kind contained in said digital information and different from said first kind.

32. A memory medium storing an information processing method, said method comprising:

an input step of inputting digital information in which digital watermark information is embedded, wherein said digital information is composed of signal components of plural kinds; and a discrimination step of discriminating whether the digital watermark information is embedded in the signal component of a first kind, based on the signal component of a second kind contained in said digital information and different from said first kind.

* * * * *

UNITED STATES PATENT AND TRADEMARK OFFICE
CERTIFICATE OF CORRECTION

PATENT NO. : 6,535,616 B1
DATED : March 18, 2003
INVENTOR(S) : Junichi Hayashi et al.

It is certified that error appears in the above-identified patent and that said Letters Patent is hereby corrected as shown below:

Title page,
Item [56], "p. 87-83" should read -- p. 87-93 --.

Drawings,
Figure 6, Reference S607, "ALL TREE?" should read -- ALL TREES? --.
Figure 11, Reference S1104, "WITH" should read -- WITHIN --; and
Figure 11, Reference S1107, "ALL TREE?" should read -- ALL TREES? --.

Column 1,
Line 18, "environment," should read -- environments, --.

Column 5,
Line 10, "processing" should read -- processing of --; and
Line 67, "a" should read -- an --.

Column 6,
Line 1, "L1" should be deleted; and
Line 18, "case," should read -- a case --.

Column 8,
Line 20, "containing in the minimum range-sub" should read -- contained within the minimum sub-range --.

Column 9,
Line 39, "sub" should read -- sum --.

Column 11,
Line 36, "code" should read -- codes --.

Column 12,
Line 8, "free" should read -- tree --; and
Line 53, "necessitated." should read -- needed --.

Column 13,
Line 27, "arbitrary" should read -- arbitrarily --.

Column 14,
Line 49, "x i" should read -- $x\_i$ --.

Column 17,
Line 44, "necessitated" should read -- needed --.

UNITED STATES PATENT AND TRADEMARK OFFICE
CERTIFICATE OF CORRECTION

PATENT NO.    : 6,535,616 B1
DATED         : March 18, 2003
INVENTOR(S)   : Junichi Hayashi et al.

It is certified that error appears in the above-identified patent and that said Letters Patent is hereby corrected as shown below:

<u>Column 18,</u>
Line 19, "arbitrary" should read -- arbitrarily --; and
Line 58, "provided" should read -- provided with --.

<u>Column 19,</u>
Line 39, "necessitated" should read -- needed, --.

<u>Column 20,</u>
Line 12, "unit" should read -- units --.

<u>Column 21,</u>
Line 64, "arbitrary" should read -- arbitrarily --.

<u>Column 23,</u>
Line 55, "magnetooptical" should read -- magneto-optical --.

<u>Column 24,</u>
Line 10, "principal 10" should read -- principal --.

<u>Column 25,</u>
Line 58, "according" should read -- according to --.

Signed and Sealed this

Twenty-first Day of October, 2003

JAMES E. ROGAN
*Director of the United States Patent and Trademark Office*